Nov. 26, 1940.  J. C. McCUNE  2,223,113
FLUID PRESSURE BRAKE
Filed July 27, 1938
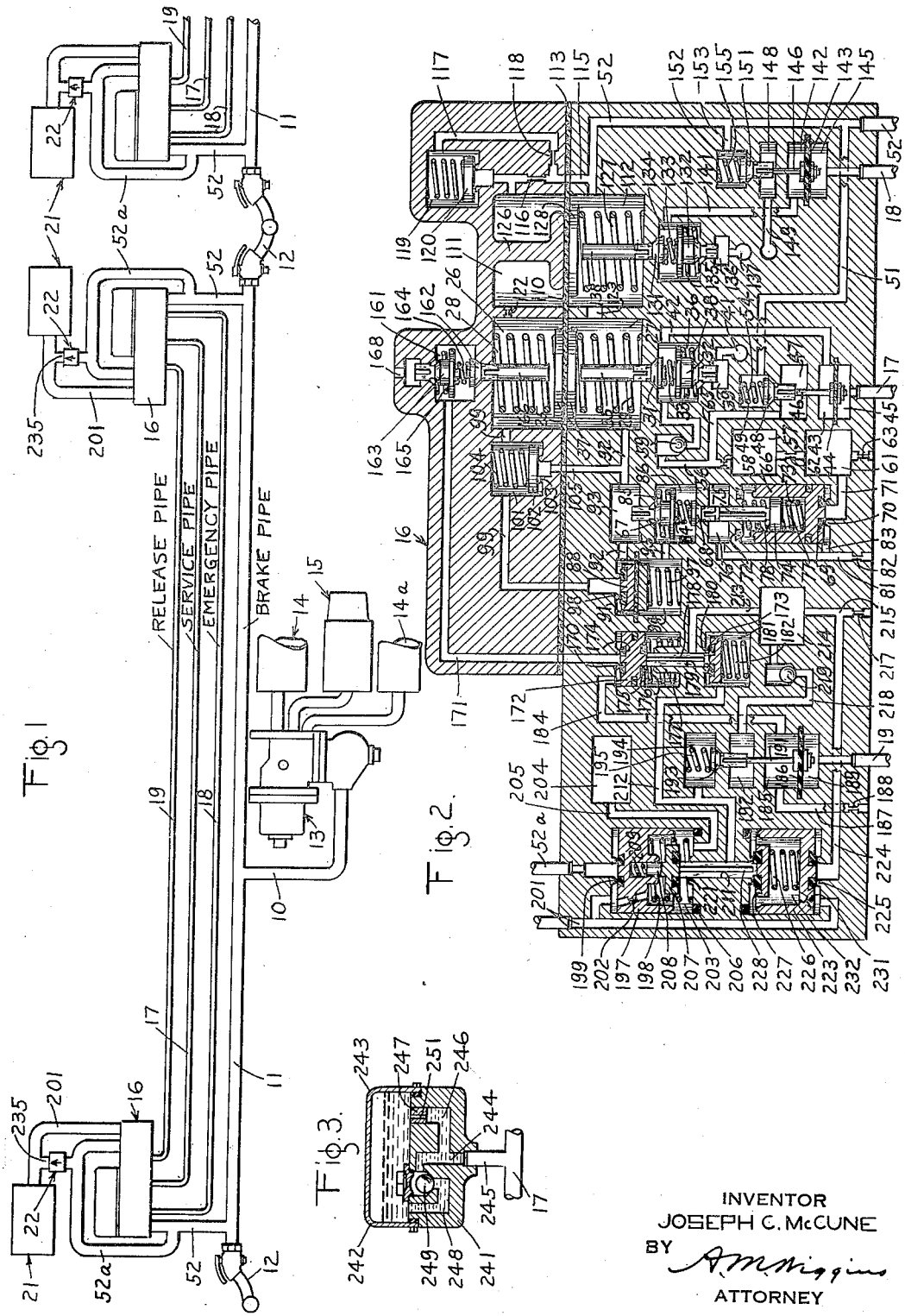
INVENTOR
JOSEPH C. McCUNE
BY
ATTORNEY Patented Nov. 26, 1940

2,223,113

UNITED STATES PATENT OFFICE 2,223,113

FLUID PRESSURE BRAKE

Joseph C. McCune, Edgewood, Pa., assignor to The Westinghouse Air Brake Company, Wilmerding, Pa., a corporation of Pennsylvania Application July 27, 1938, Serial No. 221,534

39 Claims. (Cl. 303—66)

This invention relates to fluid pressure brakes for vehicles, such as railway trains, in which the application and release of the brakes on the cars of the train is controlled by variations in a train or brake pipe, normally charged with fluid under pressure, extending throughout all of the cars of the train; and has particular relation to means for increasing the speed of propagation of a pressure variation through the brake pipe from the head to the rear end of the train to cause more nearly simultaneous operation of the brakes on the cars throughout the train.

As is well known, in present day conventional fluid pressure brake equipment for railway trains operating in either passenger or freight service, the application and the release of the brakes on the locomotive and cars of the train is controlled by variations of pressure in the brake pipe that extends throughout all the cars of the train, such variations being effected by means of a brake valve located on the locomotive at the head end of the train. Due to the time required for a pressure reduction or a pressure increase initiated in the brake pipe at the head end of the train to travel through the brake pipe toward the rear end of the train, it will be apparent that the operation of the brakes on successive cars toward the rear end of the train is effected serially. With present day fluid pressure brake equipment the speed of propagation of the pressure reduction or pressure increase impulse is sufficiently rapid to satisfactorily control the slack action in the train and prevent undue shock to cars in the train due to the running-in or the running-out of train slack resulting from the initiation of application and release of the brakes on different cars at slightly different times.

With the recent trend toward high speed operation of railway trains, new problems incident to adequate and proper braking of trains have arisen. One of the primary problems which has arisen in connection with the operation of railway trains at speeds of the order of 100 miles per hour in contrast to the more usual present day lower speeds of sixty or seventy miles per hour arises when it is desired to increase the braking power to bring a high speed train to a stop in the same or less distance than the usual stopping distance for lower speed trains. It will be apparent that in order to bring a given train to a stop from a relatively high speed in the same or less stopping distance as from a relatively low speed, higher braking power must be exerted because of the higher kinetic energy of the train at the higher speed.

Aside from the problems incidental to the provision of brake equipment for providing increased braking power and withstanding the increased mechanical and frictional stresses, there is the additional problem of preventing undesirable slack action in the train due to the increase of braking power.

It will be apparent that if the braking power exerted on a car of a train is increased, the car will naturally decelerate at a correspondingly greater rate. Thus, if the rate of propagation of a pressure reduction impulse through the brake pipe is not increased above that in present day conventional brake equipment, the run-in of slack in the train will be more severe due to the greater rate of retardation of the cars at the head end of the train on which the application of the brakes is initiated prior to the application of the brakes on successive cars toward the rear end of the train.

In order to provide smooth braking action in high speed trains of the non-articulated type it is expedient, therefore, to increase the speed of propagation of a pressure variation impulse through the brake pipe in order to decrease the time lag between the initiation of application of the brakes on cars toward the rear end of the train relative to the initiation of application of the brakes on the cars toward the head end of the train. In other words, it is expedient to apply the brakes on all of the cars of the train more nearly simultaneously in order to avoid severe running-in of the slack in the train and thus produce the smooth braking action necessary in passenger trains for comfort and even safety of passengers.

In order to enable fast time schedules, the operation of railway trains in high speed service entails not only the stopping of trains in distances equal to or less than present day conventional stopping distances, as at station stops, but also the accurate and reliable control of the degree of application of the brakes so that the train is not unduly slowed or decreased in speed at curves, switches or points of track repair. Obviously with prompt acting and effective brake equipment, close regulation of the speed of the train can be effected and, consequently, time may be saved which might otherwise be lost due to the unnecessary slowing down of the train.

Another factor which makes it desirable to provide a brake equipment suitable for high speed train operation is that the track capacity can be increased and the automatic signal control based upon shorter stopping distances. Obviously, with shorter stopping distances, the track block spacing can be reduced in the case of passenger train operation with the resultant increase in track capacity.

In the case of the modern articulated high speed passenger trains wherein the same cars remain constantly connected together in service it is possible to provide electropneumatic braking equipment including train wires extending through all cars for obtaining practically simultaneous application of the brakes and release of the brakes on all the cars whereby smooth braking operation and other advantages above indicated may be obtained.

In the case of existing passenger cars, such electropneumatic equipment is not a practical expedient for the reason that electropneumatic equipment necessitates all cars of the train being equipped for electropneumatic operation. The practical difficulties involved if the brake equipment on existing cars were to be modified or converted into an electropneumatic train wire type of brake equipment should be readily apparent, for the reason that conversion of the brake equipment cannot be effected except over a long period of time and consequently, it would be impossible to secure or make up a train in which all cars would be equipped with electropneumatic brake equipment.

It is accordingly desirable to provide means for increasing the speed of propagation of a brake control impulse serially through the cars of a train without necessitating that all cars in a train be equipped with accelerating means.

My invention accordingly contemplates the provision of equipment for individual cars including a valve mechanism at each end of the car associated, as by hydraulic connection, so as to operate substantially simultaneously to produce substantially simultaneously at both ends of the car a pressure variation in the brake pipe in response to a pressure variation traveling through the brake pipe and first reaching either end of the car. Such equipment on cars provided therewith accelerates the propagation of a pressure variation through the brake pipe at a faster rate than is possible in the case of conventional present day brake equipment and the maximum gain in respect to increased speed of propagation of a pressure variation through the brake pipe is obtained when all cars of the train are suitably equipped. However, it is not essential that every car be equipped with accelerating mechanism.

The operation of trains made up of existing present day passenger cars for which the provision of electropneumatic train wire brake equipment is impractical makes it desirable also to provide a brake equipment therefor which will effect a more rapid and simultaneous release of the brakes on all cars either for a complete release or for a graduated release. My invention accordingly further contemplates the addition to existing car brake equipment of accelerating means effective to cause a local supply of fluid under pressure to the brake pipe at both ends of the car substantially instantaneously upon a pressure increase in the brake pipe first reaching either end of the car.

With the accelerating equipment self-confined to each car and related through the brake pipe from car to car, it is not essential that all of the cars in a train be equipped with accelerating equipment. Thus, my invention is a practical expedient for improving the operation of the brake equipment of existing cars when employed in high speed service or in the more usual lower speed service.

In propagating a brake control impulse serially through the cars of the train in a manner to employ that portion of the brake pipe including the hose connection between the rear end of one car and the head end of another car, it is necessary that the accelerating equipment on the cars operate rapidly enough so that the propagation of the brake control impulse through the brake pipe is effected at a more rapid rate than the initiating pressure variation in the brake pipe in order to obtain any benefit from the accelerating equipment. My invention accordingly further contemplates the provision of accelerating equipment on the cars which is so sensitive and so rapid in operation as to effect such a result.

It is accordingly an object of my invention to provide accelerating means applicable to the fluid pressure brake equipment on existing cars for increasing the speed of propagation of a brake control impulse serially through the train.

Another object of my invention is to provide a brake equipment of the character indicated in the foregoing object and including hydraulic transmission means for propagating a brake control impulse from one end of the car to the other in response to a pressure variation set up in the brake pipe.

Another object of my invention is to provide an accelerating equipment applicable to fluid pressure brake systems and including valve means on the cars for selectively locally reducing brake pipe pressure at a service rate or at an emergency rate and for locally supplying fluid under pressure to the brake pipe in response to an impulse hydraulically transmitted thereto from a smiliar valve means at the opposite end of the car, whereby to accelerate the rate of propagation of a brake control impulse serially through the cars of the train and effect more nearly simultaneous application and release operation of the brakes on the cars throughout the train.

Another object of my invention is to provide a means for accelerating the propagation of each successive step or variation of brake pipe pressure when effecting a graduated release of the brakes.

Another object of my invention is to provide accelerating means effective to increase the rate of propagation of a pressure variation in the brake pipe and constantly effective for successive incremental steps of increase in brake pipe pressure in effecting a graduated release of the brakes and including means for simultaneously supplying fluid under pressure to the brake pipe from separate local sources at both ends of a car.

A further object of my invention is to provide accelerating means for increasing the rate of propagation of a pressure variation impulse serially through the brake pipe and adapted to automatically produce a succession of spaced pressure variations in the brake pipe in response to and in advance of an initiating pressure variation set up in the brake pipe under manual control whereby to increase the rapidity of application and release of the brakes on the cars.

A still further object of my invention is to guard against undesired application of the brakes following a release of the brakes resulting from overcharge of the brake pipe in a brake equipment including propagation accelerating means of the character indicated in the foregoing objects.

A still further object of my invention is to provide a brake equipment having hydraulic transmission means on the cars for propagating a brake control impulse and including a method and means for preventing undesired application of the brakes due to expansion of the hydraulic medium resulting from increase of climatic temperature under service conditions.

The above objects, and other objects of my invention which will be made apparent hereinafter, are obtained by means of an embodiment of my invention subsequently to be described and shown in the accompanying drawing, wherein Fig. 1 is a diagrammatic view showing a conventional fluid pressure brake equipment for a railway car and the hydraulic propagating mechanism provided according to my invention associated therewith, Fig. 2 is an enlarged sectional view of the valve mechanisms provided, according to my invention, at opposite ends of a car respectively, and Fig. 3 is a sectional view of a device which may be applied to the hydraulic pipes on each car to prevent the development of undesired pressure in the hydraulic system due to the expansion of the hydraulic medium incident to temperature change.

DESCRIPTION OF EQUIPMENT

For simplicity, my invention is illustrated in Fig. 1 in connection with only two cars of a train but it should be understood that the equipment described is provided on each car of a train. In Fig. 1, fluid pressure car brake equipment is shown comprising a section of the brake pipe 11 which is connected to the section of a brake pipe on adjacent cars through flexible hose connectors 12, a brake controlling valve device 13 illustrated for simplicity as the familiar triple valve of the graduating release type operatively responsive to variations of fluid pressure in the brake pipe 11 and having associated therewith in the usual manner an auxiliary reservoir 14, a supplemental reservoir 14a, and a brake cylinder 15.

According to my invention, a valve mechanism 16 is provided at opposite ends of each car respectively, the two valve mechanisms on each car being connected by three hydraulic pipes 17, 18 and 19 and referred to, respectively, hereinafter as the service pipe, the emergency pipe and the release pipe. There is also provided at both ends of each car a release reservoir 12 which is charged with fluid under pressure from the brake pipe 11 past a one-way or check valve 22, the valve mechanism 16 at each corresponding end of the car functioning to control the supply of fluid under pressure from the release reservoir to the brake pipe in the manner to be hereinafter described.

Considering the parts of equipment in greater detail, it should be understood that the brake pipe 11 is normally charged to a certain pressure in the usual manner from a main reservoir on a control car, such as the locomotive, under the control of a conventional brake valve device, not shown, which is operative in the usual manner to effect a desired amount of reduction in the brake pipe pressure at a service rate or a reduction at an emergency rate.

Each brake controlling valve device 13, only one of which is shown, is connected to the brake pipe through a branch pipe 10 and operatively controlled by variations of pressure in the brake pipe. When the brake pipe is charged to the normal pressure carried therein, the valve device 13 is effective to charge the auxiliary reservoir 14 and supplemental reservoir 14a to the pressure carried in the brake pipe and to vent fluid under pressure from the brake cylinder 15 to effect release of the brakes on the cars. Upon a reduction in brake pipe pressure at a service rate, the valve device 13 is operative to cause fluid under pressure to be supplied from the auxiliary reservoir 14 to the brake cylinder 15 at a service rate to effect a service application of the brakes, the degree of the service application depending upon the amount of reduction in brake pipe pressure. Upon a reduction of brake pipe pressure at an emergency rate, the valve device 13 is operative to supply fluid under pressure from the auxiliary reservoir 14 to the brake cylinder 15 at an emergency rate to effect an emergency application of the brakes. Upon an increase of the pressure in the brake pipe following application of brakes, the valve device 13 is effective to increase the pressure in the auxiliary reservoir 14 correspondingly and to vent fluid under pressure from the brake cylinder 15. At the same time, the supplemental reservoir 14a is connected in the valve device 13 so as to cause shifting of the slide valve mechanism in the valve device to release lap position when the increase in brake pipe pressure ceases. When pressure in the brake pipe is completely restored to normal value, the slide valve mechanism of valve device 13 remains in its release position in which the auxiliary reservoir and supplemental reservoir are charged to the pressure in the brake pipe.

The valve mechanism 16 is shown, for convenience, in Fig. 2 in diagrammatic extended form but it will be understood that in practice the casing of the valve mechanism is suitably sectionalized for assembly and disassembly and the arrangement of the parts is such as to form a relatively small and compact unit.

Each valve mechanism 16 comprises a service portion, an emergency portion, and a release portion. Considering these portions of the valve mechanism in the order named, the service portion includes a service diaphragm 25 suitably clamped along the periphery thereof in the casing so as to form at one side thereof a chamber 26 and at the opposite side thereof a chamber 27. The chambers 26 and 27 are relatively small being of the order of possibly 40 or 50 cubic inches for a reason which will be hereinafter made apparent. With the chambers 26 and 27 charged with fluid at the same pressure from the brake pipe in the manner to be hereinafter described, the service diaphragm 25 is positioned in a normal central position due in part to its own inherent resiliency and in part to the opposing forces exerted on the diaphragm by two springs 28 and 29 located in chambers 26 and 27 respectively. The springs 28 and 29 are of such strength that when the differential of the fluid pressure in one of the chambers 26 and 27 over the pressure in the other of the chambers exceeds a certain amount, such as three-quarters of a pound per square inch, the diaphragm is flexed in the direction of the chamber having the lower pressure.

Associated with and adapted to be operated by downward flexing of the diaphragm 25 is a collapsible type double beat valve device including an upper supply valve 31 and a lower release valve 32, a coil spring 33 being interposed between the valves 31 and 32 to urge the valves apart. The supply valve 31 has a stem 35 fluted adjacent the valve which extends through a suitable bore connecting the chamber 27 to a chamber 36 containing the valves 31 and 32 to a point in close proximity to a follower disc 37 interposed between the lower face of the diaphragm and the spring 29.

The release valve 32 has a flange formed thereon and a coil spring 38 is interposed between the flange and the casing in such manner as to normally unseat the release valve 32 and seat the supply valve 31. The release valve 32, when unseated, establishes communication from the chamber 36 to a chamber 39 which is constantly connected to atmosphere through an exhaust port and passage 41.

The chamber 36 is connected through a passage 42 to a chamber 43 formed at one side of a diaphragm 44 suitably clamped along the periphery thereof in the casing. On the opposite side of the diaphragm 44 is formed a chamber 45 which is constantly connected to a corresponding chamber of the valve mechanism 16 at the opposite end of the car through the service pipe 17. The chamber 45 and the connecting pipe 17 are filled with a suitable hydraulic medium, such as oil, glycerin or a mixture of water and an antifreeze substance, in a manner which will be hereinafter described.

The diaphragm 44 has secured thereto a stem 46 which extends in close-fitting relation through a bore formed in a wall between the chamber 43 and another chamber 47. A valve 48 of the poppet type is contained in a chamber 49 which is constantly connected to and charged with fluid under pressure from the brake pipe 11 through a branch passage 51 and a branch pipe and passage 52. The valve 48 has a fluted stem which extends into the chamber 47 and contacts the end of the stem 46 of the diaphragm 44. A coil spring 54 interposed between the valve 48 and the casing yieldingly urges the valve 48 to a seated position closing communication between the chamber 49 and the chamber 47. The stem 46 of the diaphragm 44 is of such length as to normally insure seating of the valve 48, but is effective to engage the fluted stem of the valve 48 and unseat the valve 48 in response to pressure transmitted hydraulically through the pipe 17 and effective in the chamber 45 on the lower face of the diaphragm 44.

It will be apparent that when the service diaphragm 25 flexes downwardly, the follower plate 37 engages the end of the stem 35 of the supply valve 31 to effect unseating of the valve 31 and the seating of the release valve 32. With chamber 27 beneath the service diaphragm 25 charged with fluid under pressure from the brake pipe in a manner to be hereinafter described, it will thus be seen that fluid under pressure is supplied past the supply valve 31 and through the passage 42 to the chamber 43 above the diaphragm 44, thus exerting a force on the diaphragm to cause a pressure impulse to be transmitted hydraulically to the chamber 45 at the lower side of the diaphragm 44 of the valve mechanism 16 at the opposite end of the car.

Chamber 36 is also connected through a passage 56 to a so-called quick service chamber 57. Passage 56 contains a restriction or choke 58, for controlling the rate of supply of fluid under pressure to the quick service chamber 57, and a oneway or check valve 59 of the ball type for preventing back-flow of fluid under pressure through the passage 56 to the chamber 36 for a reason which will be made apparent hereinafter.

A second quick service chamber 61 is connected serially to the first quick chamber 57 through a restricted passage or choke 62 and is open to atmosphere through a restricted passage or choke 63 for a reason which will also be made apparent hereinafter.

Chamber 47 is connected to the passage 56, at a point between the choke 58 and check valve 59, by a branch passage 65. It will thus be seen that when the supply valve 31 is unseated by the downward flexing of the service diaphragm 25, fluid under pressure is vented from chamber 27 and, as will be seen hereinafter, from the brake pipe through the passage 56 to the quick service chambers 57 and 61. It will also be seen that when the valve 48 is unseated due to the upward flexing of the diaphragm 44, fluid under pressure is vented from the brake pipe to the quick service chambers 57 and 61. In either case, due to the close fit of the stem 46 of the diaphragm 44, the fluid pressure in the chamber 47 is not effective in chamber 43 on the upper face of the diaphragm 44. Thus the pressure impulse transmitted hydraulically to the chamber 45 beneath the diaphragm 44 is not nullified by the pressure of the fluid flowing past the valve 48.

Associated with and operatively controlled by the pressure in the quick service chamber 61 is a suppression valve device comprising a valve piston 66 and a collapsible type double beat valve having an upper supply valve 67 and a lower release valve 68. Valve piston 66 operates in a suitable bore formed in the casing and has an annular gasket 69 inset in the face thereof which seats on an annular rib seat 70 at the lower end of the bore when the valve piston 66 is urged downwardly in the manner to be subsequently described. The inner seated area of the valve piston 66 within the annular rib seat 70 is connected to the quick service chamber 61 through a passage 71.

Inset in the casing at the end of the bore containing the valve piston 66 opposite to the annular rib seat 70 is an annular gasket 72, on which the valve piston 66 is adapted to seat when shifted upwardly away from the annular rib seat 70, to prevent leakage of fluid under pressure past the valve piston to the back side thereof. Loosely contained in a recess 73 formed on the back side of the valve piston 66 is a piston 74 having a fluted stem 75 which projects through a suitable opening in the casing wall at the upper end of the bore containing the valve piston 66 into a chamber 76 where it engages the lower end of the fluted stem of the release valve 68 which also projects into the chamber 76. Interposed in the recess 73 between the back side of the piston and the piston 74 is a coil spring 77 which yieldingly permits relative movement of the valve piston 66 and the piston 74 toward each other. Interposed between the casing wall, at the upper end of the bore containing the valve piston 66, and the piston 74 is another coil spring 78 which is normally effective serially through the spring 77 to urge the valve piston 66 downwardly into seated relation on the annular rib seat 70.

Chamber 76 is connected to atmosphere through a passage 81 containing a restriction or choke 82, the purpose of which will be subsequently made apparent. The space in the bore at the outer seated area of the valve piston 66 is connected through a branch passage 83 to the passage 81 at a point between the chamber 76 and the choke 82.

Interposed between the valves 67 and 68 is a coil spring 84 which yieldingly permits movement of the valves toward each other. The supply valve 67 has a flange thereon; and a coil spring 85 interposed between the flange and the casing wall of the chamber 86 containing the valves 67 and 68 normally urges the valves 67 and 68 downwardly into unseated and seated positions, respectively.

Associated with and controlled by the valves 67 and 68 is a pressure equalizing valve 88 of the diaphragm type hereinafter designated the diaphragm valve. Formed at one side of the diaphragm valve 88 is a chamber 91 which is normally subject to the pressure in the chamber 27 at the lower side of the service diaphragm 25 through a passage 92 in which is formed a chamber 93. At the opposite side of the diaphragm valve 88 is formed a chamber 94 which is constantly connected by a passage 95 to the chamber 86 containing the valves 67 and 68.

The fluted stem of the supply valve 67 extends through a suitable opening connecting the chamber 86 to chamber 93 and thus, with the supply valve 67 unseated as it normally is, chamber 94 is also charged to the pressure of the fluid in the chamber 27 at the lower side of the service diaphragm 25. With the pressure of the fluid in the chambers 91 and 94 on opposite sides of the diaphragm valve 88 equalized, a coil spring 97 interposed between the valve 88 and the casing wall in the chamber 94 urges the diaphragm valve 88 into seated relation on an annular rib seat 98 to close communication between the chamber 91 and a passage 99 leading to the chamber 26 at the upper side of the service diaphragm 25.

Included in the passage 99 is a chamber 101 containing a one-way or check valve 102 of the disc type which is yieldingly urged into a seated relation on an annular rib seat 103 by a coil spring 104. The spring 104 is of such strength as to maintain the valve 102 seated unless the pressure in the chamber 27 at the lower side of the service diaphragm 25 and effective on the inner seated area of the valve 102 through passage 92 and a branch passage 105 exceeds the pressure in the chamber 26 at the upper side of the service diaphragm 25 by a certain uniform amount. If the pressure in the chamber 27 exceeds the pressure in the chamber 26 by an amount exceeding the strength of spring 104, check valve 102 is unseated and fluid under pressure flows from the chamber 27 to the chamber 26 until the differential of the pressure in the chambers is reduced sufficiently to permit reseating of the valve 102. Check valve 102 thus limits the differential pressure in the chamber 27 over that in chamber 26 to prevent the exertion of excessive forces on the service diaphragm 25 and resulting in possible injury or fracture thereof.

It will be seen that the diaphragm valve 88 is in parallel with the check valve 102 and likewise effective when unseated to establish communication for the flow of fluid under pressure from the chamber 27 beneath the service diaphragm 25 to the chamber 26 above the diaphragm. The function of the diaphragm valve 88, however, is different from the check valve 102 because it functions to equalize the pressure in the chambers 26 and 27 on opposite sides of the service diaphragm 25 to terminate a quick service reduction of brake pipe pressure as will be made apparent hereinafter.

Considering now the emergency portion of the valve mechanism 16, there is provided a so-called emergency diaphragm 110 having chambers 111 and 112 formed on opposite sides thereof. The emergency diaphragm 110 is indicated as formed integrally with the service diaphragm 25 in a gasket 113 adapted to be clamped between different portions of the casing of the valve mechanism, but it will be understood that the diaphragms 110 and 25 may be separate from each other and from the gasket 113. Chamber 112 beneath the emergency diaphragm 110 is connected directly to the brake pipe 11 through the branch pipe and passage 52 and the chamber 111 above the emergency diaphragm 110 is charged with fluid under pressure from the brake pipe through a branch passage 115 of the pipe and passage 52, which passage 115 contains a restriction or choke 116. In parallel relation to the restriction 116 is a passage 117 containing a restriction or choke 118 and a chamber 119 having a loaded one-way or check valve 120 therein.

The check valve 120 is arranged to prevent the supply of fluid under pressure therepast from the passage 52 to the chamber 111, but is adapted to unseat to permit the reverse flow of fluid under pressure from the chamber 111 therepast and through the passage 117 at a rate governed by the flow area of the choke 118.

It will thus be seen that the rate of charging of the chamber 111 is determined by the flow area of the choke 116 whereas the rate of reduction of the pressure in the chamber 111 is determined by the combined flow areas of the two chokes 116 and 118. This arrangement functions to in some degree minimize the possibility of overcharging chamber 111, as will be explained in greater detail hereinafter.

The chamber 111 above the emergency diaphragm 110 is connected to the chamber 26 above the service diaphragm 25 through a restricted passage or choke 122 and the chamber 112 beneath the emergency diaphragm 110 is connected to the chamber 27 beneath the service diaphragm 25 through a relatively large passage 123. It will thus be apparent that the arrangement including the chokes 116 and 118 and the check valve 120 also functions to prevent overcharging of the service chamber 26 as well as emergency chamber 111.

The choke 122 has a smaller flow area than the choke 116 so that when the pressure in the brake pipe 11 is reduced at a service rate a differential fluid pressure is produced in the chamber 26 over that in the chamber 27 sufficient to flex service diaphragm downwardly without sufficient pressure differential between chambers 111 and 112 being produced to effect downward flexing of the emergency diaphragm 110. At the same time the choke 122 is sufficiently large to prevent the undesired downward flexing of the service diaphragm 25 in response to the maximum leakage rate of reduction in brake pipe pressure.

Integrally formed on or attached to the casing of the valve mechanism 16 within the chamber 111 is a downwardly projecting stop 126 which is of such length as to prevent upward flexing of the emergency diaphragm 110 out of its normal neutral position. The purpose of the stop 126 is to prevent the undesired flexing of the diaphragm 110 upon charging of the brake pipe or an increase of the pressure therein, because the upward flexing of the diaphragm 110 serves no useful function.

Contained in the chamber 112 is a coil spring 127 which is interposed between the wall of the casing and a follower disc 128, in contact with the lower face of the diaphragm 110, in such manner as to urge the diaphragm upwardly into contact with the end of the stop 126, which is the normal position of the diaphragm.

Associated with and operated by the emergency diaphragm 110 is a collapsible type double beat valve device comprising an upper supply valve 131 and a lower release valve 132, the valves 131 and 132 being yieldingly urged apart by a coil spring 133. Interposed between a flange on the release valve 132 and the casing wall of the chamber 134, in which the valves 131 and 132 are contained, is a coil spring 135 which normally urges the valves 131 and 132 to seated and unseated positions respectively.

With the release valve 132 unseated, the chamber 134 is connected to a chamber 136 which is constantly open to atmosphere through an exhaust port and passage 137. The supply valve 131 has a stem 138 which is fluted along a portion thereof adjacent the valve and which extends through a suitable opening connecting the chamber 134 to the chamber 112 and terminates in close proximity to the follower disc 128 associated with the emergency diaphragm 110.

When the emergency diaphragm 110 is flexed downwardly in the manner to be hereinafter described, the follower plate 128 engages the end of the stem 138 and unseated and seating of the valves 131 and 132 respectively is effected. With the supply valve 131 unseated, fluid under pressure is supplied from the diaphragm chamber 112 through a passage 141 to a chamber 142 formed at the upper side of a diaphragm 143 suitably clamped along the periphery thereof in the casing.

At the opposite side of the diaphragm 143 is a chamber 145 which is connected through the emergency pipe 18 to the corresponding chamber of the valve mechanism 16 at the opposite end of the car. The chambers 145 and emergency pipe 18 are filled with a suitable hydraulic medium, such as oil or glycerin in the same manner as service pipe 17. Accordingly, when the diaphragm 143 of the valve mechanism 16 at one end of the car is subjected to the pressure of fluid at the upper side thereof in the chamber 142 such pressure is hydraulically transmitted through the emergency pipe 18 to the chamber 145 at the lower side of the diaphragm 143 of the valve mechanism 16 at the opposite end of the car, thereby causing the diaphragm 143 of the last mentioned valve mechanism to be flexed upwardly.

The diaphragm 143 has secured thereto a stem 146 which extends through and fits closely in an opening through a wall of the casing separating the chamber 142 from a chamber 148 which is constantly connected to atmosphere through a passage and port 149. A valve 151 of the poppet type is contained in a chamber 152 which is constantly connected through a branch passage 153 with the branch pipe and passage 52 of the brake pipe. Valve 151 has a fluted stem which extends through a suitable opening connecting the chamber 152 and the chamber 148 and is yieldingly urged into seated relation on an associated valve seat formed on the casing, by a coil spring 155. When the valve 151 is seated, the fluted stem thereof is in close proximity to the end of the stem 146 of the diaphragm 143.

It will thus be seen that when the diaphragm 143 is flexed upwardly, the stem 146 thereof engages the fluted stem of the valve 151 and unseats the valve 151 so that fluid under pressure is vented from the brake pipe to atmosphere through the exhaust port and passage 149. The valve 151 is of sufficient area that it need be unseated only a few thousandths of an inch to cause a very rapid venting of fluid under pressure from the brake pipe. Due to the close fit of the stem 146 with the opening in the casing wall through which it extends, the fluid under pressure released to atmosphere past the valve 151 cannot act on the upper side of the diaphragm 143 to nullify the hydraulic pressure exerted on the lower side of the diaphragm in chamber 145.

Considering now the release portion of the valve mechanism 16, there is provided in a chamber 161 adjacent the chamber 26 above the service diaphragm 25 a collapsible type double beat valve device having a lower supply valve 162 and an upper release valve 163 between which valves is interposed a coil spring 164 for yieldingly urging the valves apart. The release valve 163 has a flange thereon and a coil spring 165 interposed between this flange and the casing wall normally yieldingly urges the valves 163 and 162 into unseated and seated positions with respect to associated valves seats formed on the casing.

The supply valve 162 has a stem 166 which is fluted along a portion thereof adjacent the valve and extends through a suitable opening connecting the chamber 161 and the chamber 26, the stem 166 terminating at a point in close proximity to a follower plate 37 in contact with the upper side of the service diaphragm 25 when the service diaphragm 25 is in its normal position.

When the release valve 163 is unseated, it opens the chamber 161 to atmosphere through an exhaust port and passage 168.

It will thus be seen that when the service diaphragm is flexed upwardly from its normal position, the follower disc 37 on the upper face thereof engages the end of the stem 166 of the supply valve 162 and shifts the valves 162 and 163 to unseated and seated positions respectively.

It will be evident that since the chamber 27 beneath the service diaphragm 25 is in direct unrestricted communication with the brake pipe while the chamber 26 above the service diaphragm 25 is in communication with the brake pipe through the series related chokes 122 and 116 that, upon charging of the brake pipe, a differential pressure will be built up on the service diaphragm 25 sufficient to cause the service diaphragm 25 to be flexed upwardly.

Chamber 161 is connected through a passage 171 to the inner seated area of a piston valve 172 which operates a vent valve 173. The piston valve 172 is provided with annular gaskets 174 and 175 on opposite faces thereof; and a coil spring 176, interposed between the piston valve 172 and the end wall of the bore in which the piston valve operates, yieldingly urges the piston valve 172 upwardly to seat the annular gasket 174 on an annular rib seat 170 within which the passage 171 opens.

Spring 176 is of such strength as to require a certain predetermined pressure, such as 75 pounds per square inch, to act on the inner seated area of the piston valve 172 to unseat it from the annular rib seat 170. When the piston valve 172 is unseated sufficiently downward from the annular rib seat 170, the annular gasket 175 seats on annular rib seat 177 formed on the casing wall on the opposite side of the piston.

The vent valve 173 has a fluted stem 178 which extends through a bore 179 in the casing and engages the lower face of the piston valve 172 within the annular gasket 175. The vent valve 173 is contained in a chamber 181; and a coil spring 182 interposed in chamber 181 between the wall of the casing and the vent valve 173 yieldingly urges the vent valve into seated relation on an annular rib seat 180 within the chamber 181 and surrounding the bore 179, when the piston valve 172 is seated on the annular rib seat 170.

When the piston valve 172 is unseated from its seat 170 in response to the pressure fluid supplied through the passage 171, it establishes communication between the passage 171 and a passage 184 leading to a chamber 185 at the upper side of a diaphragm 186. Chamber 185 is constantly open to atmosphere through a passage 187 having a restriction or choke 188 therein, for venting fluid under pressure from chamber 185 while at the same time not preventing the build-up of pressure on the diaphragm 186 in chamber 185. On the opposite side of the diaphragm 186 is a chamber 189 which is connected through the release pipe 19 with a corresponding chamber of the valve mechanism 16 at the opposite end of the car. The chamber 189 and the pipe 19 are filled with a hydraulic medium just as are the service and emergency pipes 17 and 18.

The pressure of fluid supplied to the chamber 185 flexes the diaphragm 186 downwardly and accordingly a pressure impulse is propagated hydraulically to the chamber 189 of the valve mechanism 16 at the opposite end of the car to cause the latter diaphragm to flex upwardly. The diaphragm 186 has secured thereto a stem 191 which fits closely in and extends through an opening in the casing wall of the chamber 185 into a chamber 192.

A valve 193 of the poppet type is contained in a chamber 194 adjacent the chamber 192 and is provided with a fluted stem which extends into the chamber 192 through a suitable opening connecting the chambers 192 and 194 and is adapted to be engaged by the end of the stem 191 of the diaphragm 186. With the diaphragm 186 in its normal unflexed position, a coil spring 195 is effective to yieldingly urge the valve 193 into seated relation on an associated valve seat in which position the end of the stem 191 of the diaphragm is in close proximity to the end of the fluted stem of the valve 193. It will thus be seen that when the diaphragm 186 is flexed upwardly, the stem 191 thereof engages and unseats the valve 193.

The vent valve 173 and the valve 193 are arranged in parallel relation so that either may effect operation of an inshot valve piston 197 effective to control the supply of fluid under pressure from the release reservoir 21 to the brake pipe.

The inshot valve piston 197 operates in a suitable bore and is normally yieldingly urged upwardly by a coil spring 198 at the back side thereof into seated relation on an annular rib seat 199 formed on the casing at the upper side of the valve piston. A pipe and passage 52a which opens within the annular rib seat 199 is connected to the branch pipe 52 of the brake pipe 11. The annular space at the outer seated area of the valve piston 197 is connected through a passage and pipe 201 to the release reservoir 21. A restricted port 202 in the valve piston 197 connects the outer seated area of the valve piston to a chamber 203 at the back side thereof. A stabilizing chamber 204 formed in the casing is constantly connected through a passage 205 with the chamber 203 for providing additional volume for the chamber 203 and thereby stabilizing the operation of the inshot valve piston 197.

When the pressure in the chamber 203 and connected chamber 204 is suddenly reduced, the release reservoir pressure acting on the outer seated area of the valve piston 197 overcomes the spring 198 and shifts the valve piston downwardly away from the annular rib seat 199 and into seated relation on an annular gasket seat 206 inset in the casing on the opposite side of the valve piston, thereby preventing leakage of fluid under pressure past the valve piston to the chamber 203.

In order to cause a relatively quick return of the valve piston 197 to seated position on the annular rib seat 199, a valve 207 having a stem 208 guided in a central recess in the valve piston 197 is provided to close the exhaust communication for the chamber 203 when the valve piston is shifted into seated engagement with the annular gasket seat 206. A coil spring 209 interposed between the end of the stem 208 and the valve piston 197, in the recess containing the stem 208, yieldingly permits relative movement of the valve 207 relative to the valve piston to insure seating of the valve piston on the annular gasket seat 206.

Fluid under pressure is vented from the chamber 203 through a bore 211 out of which opens a passage 212 that is connected to the chamber 194 and to the chamber 181. The vent valve 173 which is contained in the chamber 181 is effective when unseated to establish communication from the passage 212 to a passage 213 leading to a volume chamber 214, the chamber 214 being constantly connected to atmosphere through a passage 215 having a restriction or choke 217, the purpose of which will be made apparent hereinafter.

The valve 193 which is contained in the chamber 194 is effective, when unseated, to connect the chamber 194 to the chamber 192 which is in turn connected through a passage 218, including a ball check valve 219, to the chamber 214. The check valve 219 is arranged to permit flow of fluid under pressure through the passage 218 to the volume chamber 214 and to prevent reverse flow of fluid under pressure therepast.

It should thus be apparent that when the vent valve 173 is unseated, fluid under pressure is vented from the chamber 203 to the volume chamber 214 to cause operation of the inshot valve piston 197 and also that, when the valve 193 is unseated, fluid under pressure is likewise vented from the chamber 203 to the volume chamber 214 to effect operation of the inshot valve piston 197.

The valve 207 associated with the valve piston 197 is adapted to seat on an annular rib seat 221 surrounding the bore 211 when the valve piston 197 is shifted downwardly into engagement with the annular gasket seat 206, thus closing the exhaust communication from the chamber 203.

The size of the restricted port 202 in the valve piston 197 is such with respect to the combined volume of the chambers 203 and 204 as to permit equalization of the pressures on opposite sides of the valve piston 197 in a limited time which is relatively short, thus causing the valve piston to be shifted back upwardly into seated position on the annular rib seat 199 to close the connection between the release reservoir 21 and the brake pipe.

In order to prevent pumping of the valve piston 197, that is, a rapid succession of operations of the valve piston 197, there is associated with the valve piston another valve piston 223. Valve piston 223 is contained in a suitable bore in the casing and is adapted to control the supply of fluid under pressure from the release reservoir 21 and passage and pipe 201 to a passage 224 which is connected to the volume chamber 214 through the passage 215. The valve piston 223 is normally urged downwardly into seated relation on an annular rib seat 225 by a coil spring 226 which is interposed between the back side of the valve piston and a vent valve 227. Vent valve 227 is provided with a fluted stem 228 which extends through the bore 211 into the chamber 203 and unseats the valve 207 associated with the valve piston 197. The valve piston 223 has a restricted port 231 therein through which equalization of pressure on opposite sides of the valve piston is effected.

When the inshot valve piston 197 is shifted downwardly to supply fluid under pressure from the release reservoir into the brake pipe, the downward movement of the valve 207 causes unseating of the vent valve 227. With the vent valve 227 unseated, the chamber 232 at the back of the valve piston 223 is vented through the bore 211, passage 212 and past either the vent valve 173 or the valve 193, depending upon which is unseated, to the volume chamber 214. Thus, immediately following the unseating of the inshot valve piston 197, the valve piston 223 is likewise unseated from the annular rib seat 225 to establish communication between the passage 201 connected to the release reservoir and the passage 224 connected to the volume chamber 214.

The volume of the volume chamber 214 is relatively small in comparison to the volume of the release reservoir 21 and thus when the valve piston 223 is unseated, the pressure in the chamber 214 is almost instantly built up to the pressure in the release reservoir. The pressure of the fluid in the chamber 214 is effective through the passage 213 and bore 179 on the lower inner seated area of the piston valve 172 to oppose the pressure of the fluid supplied through the passage 171 to the opposite face of the piston 172. The spring 176 accordingly acts to shift the piston valve 172 upwardly back to seated relation on the annular rib seat 176. Reseating of the vent valve 173 is thus effected prior to the return of the valve piston 197 into its seated position on the annular rib seat 199.

It will accordingly be seen that when the inshot valve piston 197 is unseated as a result of the unseating of the piston valve 172, it is unseated for a certain length of time to supply fluid under pressure from the release reservoir to the brake pipe, and then reseated. But since the vent valve 173 has in the meantime been reseated, the inshot valve 197 will not again be unseated until the pressure in the volume chamber 214 reduces sufficiently through the choke 217 to enable the pressure of the fluid supplied through the passage 171 to again operate the piston valve 172 to unseat the vent valve 173. This operation will be explained in somewhat greater detail hereinafter but it should be understood at this point that the operation of the release portion of the valve mechanism is such as to effect automatically, on occasion, a succession of operations of the inshot valve 197 to supply fluid under pressure from the release reservoir to the brake pipe without undesirable pumping of the inshot valve 197.

As indicated in Fig. 1, the check valve 22 is connected in a pipe 235 which joins the release reservoir pipe 201 and pipe 52a connected to the branch pipe 52 of the brake pipe. The check valve 22 is arranged so as to permit the supply of fluid under pressure from the brake pipe to the release reservoir and to prevent reverse flow past the check valve to the brake pipe. Accordingly as long as the pressure in the release reservoir 21 exceeds the pressure in the brake pipe, there will be no flow of fluid under pressure from the brake pipe to the release reservoir. As will be hereinafter explained, the release reservoir 21 is of such volume capacity as to remain at a pressure above that in the brake pipe until venting of fluid under pressure from the brake cylinder and the consequent release of the brakes is effected. Thus, during a release operation, the reservoirs 21 are not initially a drain on the brake pipe and do not impede the rapid build-up of pressure in the brake pipe.

OPERATION OF EQUIPMENT (a) Charging of hydraulic system

It has been previously stated that the pipes 17, 18 and 19 and the connected chambers in the valve mechanisms 16 at opposite ends of the pipes are filled with a hydraulic medium, such as oil, glycerin, or a mixture of water and an antifreeze substance. For simplicity, the manner in which the pipes 17, 18 and 19 are filled with the hydraulic medium is not shown in the drawing but it will be understood that each of the pipes 17, 18 and 19 are provided with a suitable connection through which the hydraulic medium may be supplied into the pipe and sealed therein. For example, a detachable filling pipe may be connected to each of the pipes and arranged to extend to a point higher than any point in the pipes and associated chambers of the valve mechanisms 16, thus insuring complete filling of the pipes and connected chambers. If desired, the hydraulic medium may be supplied initially under pressure to the pipes 17, 18 and 19 to insure substantially complete filling, the pressure of the hydraulic medium being relaxed to atmospheric pressure before sealing the inlet to the pipes. Suitable vent valves, not shown, may be provided at intervals along the pipes 17, 18 and 19 and at other locations to permit the removal of air trapped in the pipes upon filling thereof.

Since the pipes 17, 18 and 19 and the connected chambers at opposite ends thereof are adapted to be substantially completely filled, the relatively greater coefficient of cubical expansion of the liquid as compared to that of the metallic material of which the pipes 17, 18 and 19 may be composed may produce undesired pressure in the pipes due to the greater expansion of the liquid as compared to that of the pipes in response to an increase of temperature.

It is preferred, therefore, to heat the hydraulic medium to a temperature considerably in excess of the maximum temperature which it may attain under service conditions before supplying it into the pipes 17, 18 and 19. Thus, when the hydraulic medium cools to normal temperature after being sealed in the pipes, a slight degree of partial vacuum may be produced therein. However, since the diaphragms 44, 143 and 186 subject to the pressure at opposite ends of the pipes 17, 18 and 19, respectively, are of identical areas, the atmospheric pressure normally maintained in the chambers 43, 142 and 185 above the diaphragms will exert opposing balanced forces. Consequently, undesired flexing of the diaphragms will not occur. In the event of the expansion of the liquid due to the increase of climatic temperature no undesired pressure will be created in the pipes tending to cause undesired operation of the valve mechanisms 16.

If desired, each of the pipes 17, 18 and 19 may have connected thereto an expansion device as shown in Fig. 3. As seen in Fig. 3, such device may comprise a casing having a base portion 241 and a cup-shaped cover 242 adapted to be removably secured in sealed relation to the point 241 to provide a chamber 243. The base portion 241 is provided with a passage 244 which is connected to the pipes 17, 18 or 19 through a branch pipe 245 and which communicates through a branch passage 246 containing a choke element 247 with the chamber 243. The passage 244 also communicates with chamber 243 through a passage 248 containing a check valve 249 illustrated as of the ball type. The check valve 249 is arranged, as shown, to prevent the supply of hydraulic medium from the pipes 17, 18 and 19 through the passage 248 to the chamber 243 and to permit the reverse flow of hydraulic medium therepast from the chamber 243 to the pipes 17, 18 and 19.

The choke element 247 has a restricted passage 251 therein, the flow area of which is sufficient to permit the hydraulic medium in the pipes 17, 18 and 19 to ooze into the chamber 243 in the event that the hydraulic medium expands due to temperature increase. However, the restricted passage 251 is so tiny in flow area that a negligible amount of hydraulic medium will flow to the chamber 243 from the pipes 17, 18 and 19 when the diaphragms 44, 143 and 186 are subjected to fluid under pressure. Thus there is provision for accommodating the increased volume of the hydraulic medium due to expansion without in any way interfering with the proper functioning of the valve mechanisms 16 in propagating hydraulically a pressure impulse from one end of the car to the other. Obviously, if there is any air trapped in the chamber 243 above the hydraulic medium therein, it does not interfere with the hydraulic propagation of a pressure impulse from one valve mechanism 16 to the other at the opposite end of the car. It will be obvious that when the volume of the hydraulic medium in the pipes 17, 18 and 19 contracts due to a decrease of climatic temperature under service conditions, the hydraulic medium will be returned to the pipes past the check valve 249 due to the pressure of the air trapped in the chamber 243 above the hydraulic medium.

It may be that an expansion device of the character shown in Fig. 3 and just described may not be required in every instance but it is intended that such devices be provided to insure against any possible undesired development of pressure in the hydraulic pipes 17, 18 and 19 due to expansion of the hydraulic medium resulting from an increase in temperature.

It will be apparent that once the pipes 17, 18 and 19 are filled with hydraulic medium as above described, no maintenance or servicing thereof is required since the hydraulic medium remains sealed within the pipes, barring leakage from or breakage of the pipes.

*(b) Charging of the fluid pressure system*

When the brake pipe 11 is initially charged in the usual manner under the control of the brake valve (not shown) at the head end of the train, fluid under pressure flows through the branch pipes 52, 52a and 235, past the check valve 22 and through pipe 201 to the various release reservoirs 21. Fluid under pressure also flows from the brake pipe through the branch pipes 10 to the brake controlling valve devices 13 each of which is thereby conditioned to charge the associated auxiliary reservoir 14 and supplemental reservoir 14a and connect brake cylinder 15 to atmosphere.

For purposes of the present application it is assumed that the main reservoir pressure is normally of the order of 125 pounds per square inch and that feed valve pressure to which the brake pipe is normally charged is of the order of 110 pounds per square inch. Accordingly, the release reservoir 21, the auxiliary reservoirs 14 and supplemental reservoirs 14a are charged to a normal pressure of 110 pounds per square inch.

Upon the charging of the brake pipe 11 on each car, fluid under pressure flows also through the branch pipe 52 to the chambers 27 and 112 beneath the service diaphragm 25 and emergency diaphragm 110 respectively and also through the passage 92 and past the unseated valve 67 to the chambers 91 and 94 on opposite sides of the diaphragm valve 88. Accordingly, diaphragm valve 88 remains seated. Fluid under pressure is also supplied through the passage 15 and choke 116 to the chamber 111 above the emergency diaphragm 110 and thence through the choke 122 to the chamber 26 above the service diaphragm 25. A differential pressure urging the emergency diaphragm 110 upwardly is accordingly produced but upward flexing of the diaphragm 110 is prevented by stop 126.

A differential force is also created on the service diaphragm 25 and it is accordingly flexed upwardly to effect unseating and seating of the valves 162 and 163 respectively. Due to the unseating of the valve 162, fluid under pressure escapes from the chamber 26 into the passage 171 and acts on the inner seated area of the piston valve 172. Since, as previously stated, the spring 176 is of sufficient strength to resist unseating of the piston valve 172 from the annular rib seat 174 until the pressure in the passage 171 exceeds a pressure such as 70 or 75 pounds per square inch, the passage 171 charges up to the pressure in the chamber 26.

In the event that an excessive differential force flexing the service diaphragm 25 upwardly is produced, the check valve 102 unseats and thus limits the degree of differential force to prevent damage to the diaphragm 25.

When the pressure of the fluid supplied to the chamber 26 and effective in the passage 171 on the inner seated area of the piston valve 172 increases sufficiently, the piston valve is operated downwardly to unseat the vent valve 173. Fluid under pressure is accordingly supplied from the passage 171 to the chamber 185 to exert a downward pressure on diaphragm 186 which pressure is transmitted hydraulically through the release pipe 19 to the diaphragm 186 of the valve mechanism 16 at the opposite end of the car, which diaphragm correspondingly flexes upwardly and unseats the valve 193 associated therewith. Accordingly, the vent valve 173 of the valve mechanism 16 on the head end of the car is unseated and almost instantly therewith the valve 193 of the valve mechanism 16 at the rear end of the car is also unseated.

As previously explained, the unseating of either the vent valve 173 or the valve 193 is effective to vent the chamber 203 at the back of the inshot valve piston 197. Accordingly, release reservoir pressure acting on the outer seated area of the inshot valve piston 197 shifts it downwardly into seated engagement on the annular gasket seat 206 and at the same time the valve 207 is shifted to seated engagement on the annular rib seat 221. The unseating of the inshot valve piston 197 establishes communication from the release reservoir pipe and passage 201 to the branch pipe 52a of the brake pipe but since the pressure in the brake pipe and release reservoir 21 is being built up simultaneously past the check valve 22, there is no flow of fluid under pressure from the release reservoir to the brake pipe at this time. Thus, the operation of the inshot valve piston 197 upon initial charging of the fluid pressure brake system is without effect.

When the valve 207 associated with the inshot valve piston 197 is seated on the annular rib seat 221, it is effective to unseat the vent valve 227 associated with the inshot valve piston 223 and accordingly the chamber 232 at the back of the valve piston 223 is vented to the chamber 214 in the manner previously pointed out past either the vent valve 173 or the valve 193 depending upon which valve is unseated. The release reservoir pressure acting in passage 201 on the outer seated area of the valve piston 223 accordingly shifts the valve piston 223 upwardly to unseat it from the annular rib seat 225 and accordingly the release reservoir passage 221 is connected to the passage 224 leading to the volume chamber 214. As previously stated, the volume in the chamber 214 is relatively small in comparison to the volume of the release reservoir 21 and consequently the pressure in the chamber 214 is very rapidly built up to release reservoir pressure which in the initial charging of the brake system is equivalent to brake pipe pressure.

The pressure of the fluid in the chamber 214 accordingly acts on the inner seated area of the piston valve 172 in its lower position and opposes the pressure exerted on the upper face of the piston 172 which is not building up as rapidly as the pressure in the chamber 214 due to the exhaust of fluid under pressure therefrom through the passage 187 and choke 188. Consequently, the spring 176 becomes effective to shift the piston valve 172 upwardly into seated relation on the annular rib seat 170, thereby effecting reseating of the vent valve 173 of the valve mechanism 16 at the head end of the car. When the piston valve 172 reseats on the annular rib seat 170, the fluid under pressure in the chamber 185 is promptly vented to atmosphere through the passage 187 and choke 188 due to the very small volume of the chamber 185. Accordingly the pressure on the diaphragm 186 of the valve mechanism 16 at the head end of the car is promptly relieved and consequently the upward pressure in the chamber 189 beneath the diaphragm 186 of the valve mechanism 16 at the opposite end of the car is relieved to effect reseating of the valve 193. Subsequent to the reseating of the vent valve 173 and the valve 193, the chamber 203 and connected volume chamber 204 become sufficiently charged through restricted port 202 in the inshot valve piston 197 that the spring 198 returns the inshot valve piston 197 into seated relation on the annular rib seat 199, thereby closing the connection between the release reservoir and the brake pipe.

When the piston valve 172 is shifted to its upper seated position on the annular rib seat 170, the lower face of the piston valve is subject to the pressure in the chamber 214 over a larger area and thus, until the pressure in the chamber 214 reduces sufficiently at a rate determined by the size of the choke 217 in the exhaust passage 215, the piston valve 172 will remain in its upper seated position. Consequently no further operation of the inshot valve piston 197 will occur until the pressure in the chamber 214 reduces to the point where the pressure in the passage 171 can again overcome the combined force of the spring 176 and the pressure in the chamber 214 acting on the lower face of the piston valve 172.

A further description of the operation of the release portion of the valve mechanism will be given in connection with a release of the brakes following a service application and subsequently to be described.

(c) *Service application of the brakes*

Assuming then that the fluid pressure system has been initially charged in the manner just indicated and that, with the train stopped or in motion, it is desired to effect a service application of the brakes, such application is initiated in the usual manner by effecting a service rate of reduction of the pressure in the brake pipe 11 under the control of the brake valve, not shown, on a control car or on the locomotive at the head end of the train.

When the pressure reduction in the brake pipe 11 reaches the branch pipe 52 leading to the valve mechanism 16 at the head end of the first car, and for purposes of the present description the head end of the car will be considered as at the left end of the drawing in Fig. 1, the service diaphragm 25 of the valve mechanism 16 at the head end of the car is flexed downwardly and causes unseating and seating of the valves 31 and 32 respectively. Upon the unseating of the valve 31, fluid under pressure is rapidly vented from chamber 27 and the connected brake pipe 11 through passage 42 to the chamber 43 and exerts a downward pressure on the diaphragm 44. The fluid pressure force in the chamber 43 is accordingly hydraulically propagated instantly through the service pipe 17 to the chamber 45 at the lower side of the diaphragm 44 of the valve mechanism 16 at the rear end of the car. The valve 48 associated with the latter diaphragm 44 is thus unseated and fluid under pressure vented therepast from the brake pipe through passages 51 and 56 to the quick service chambers 57 and 61.

In the case of the valve mechanism 16 at the head end of the car, the unseating of the valve 31 also causes fluid under pressure to be vented from the brake pipe and chamber 27 through passage 56 to the quick service chambers 57 and 61. Since the quick service chambers 57 and 61 are initially at atmospheric pressure due to the exhaust therefrom through the exhaust port 63, it will be seen that an initial quick service reduction of brake pipe pressure will be effected instantly at both the head and rear ends of the car due to the venting of fluid under pressure into the first quick service chamber 57.

Due to the connection of the second quick service chamber 61 to the first quick service chamber 57 through the choke passage 62, the fluid under pressure vented to the quick service chamber 57 flows at a restricted rate into the second quick service chamber 61 to build-up the pressure therein. Thus there is an initial quick service reduction in brake pipe pressure at a rapid rate which reduction is continued at a lesser rate after the pressure in the first quick service chamber 57 is built up substantially to the pressure in the brake pipe.

Due to the quick service local reduction in brake pipe pressure caused by the unseating of the valve 48 of the valve mechanism 16 at the rear end of a car, the quick service diaphragm 25 of the valve mechanism 16 at the head end of the next succeeding car in the train responds almost instantly to effect operation of the valves 31 and 32 in the manner previously described. Thereafter, the quick service impulse is transmitted hydraulically through the service pipes 17 on successive cars, in the manner described for the first car at the head end of the train.

It will be obvious that since local quick service reductions in brake pipe pressure are effected almost instantaneously at opposite ends of the car, and since the valve mechanism 16 at the head end of a car responds very rapidly to the local quick service reduction in brake pipe pressure at the rear of the next preceding car, the service application impulse will be propagated serially through all the cars of the train at a much higher speed than the speed of propagation of the initial pressure reduction impulse through the brake pipe set up by operation of the brake valve (not shown).

It will be also apparent that in the case of the valve mechanism 16 at the rear end of the car, the local quick service reduction in brake pipe pressure effected by the unseating of its valve 48 produces a downward flexing of its service diaphragm 25 and the consequent operation of the valves 31 and 32 to vent fluid under pressure from the brake pipe through the passage 56 past the ball check valve 59 to the quick service chambers 57 and 61 and through passage 42 to chamber 43. The pressure of fluid supplied to chamber 43 exerts a downward force on diaphragm 44 opposing the hydraulic pressure exerted in chamber 45 beneath the diaphragm and accordingly valve 48 may be instantly reseated. However, once the local quick service reduction is begun, and the service diaphragm flexed downwardly to unseat and seat valves 31 and 32, the closing of valve 48 is of no consequence because the local quick service reduction is continued past valve 31. The rate of local quick service reduction of brake pipe pressure is the same whether valves 31 and 48 are singly or jointly open since it is governed by the size of the choke 58 in the passage 56 leading to the quick service chamber 57.

The pressure in the second quick service chamber 61 builds up to a sufficient pressure to unseat the valve piston 66 of the suppression valve device because the restricted exhaust port 63 is of insufficient flow area to prevent such build-up of pressure and thus valve piston 66 will be shifted upwardly to unseat the valve 68 and seat the valve 67. Exhaust port 63 is provided to prevent undesired build-up of pressure in quick service chamber 61 due to possible leakage of fluid under pressure thereto from the brake pipe past valves 31 and 48. Fluid under pressure is thus vented from the chamber 94 beneath the diaphragm valve 88 to atmosphere past valve 68 and through passage 81 and, accordingly, the pressure in the chamber 26 above the service diaphragm 25 acting through the passage 99 on the innerseated area of the diaphragm valve 88 as well as the pressure from the chamber 27 on the outer seated area of the diaphragm valve 88 in the chamber 91 is effective to unseat the diaphragm valve. Rapid equalization of the pressure in the two chambers 26 and 27 results so that the service diaphragm 25 is promptly returned to its normal position.

The valves 31 and 32 are promptly returned to seated and unseated positions, respectively, in response to the return of the service diaphragm 25 to its normal position and the quick service venting of fluid under pressure from the brake pipe to the quick service chambers 57 and 61 is cut off. The check valve 59 prevents back flow of fluid under pressure from the quick service chambers 57 and 61 through the passage 56 to the chamber 36 and to atmosphere past the unseated valve 32. At the same time, with the valve 32 unseated, the fluid under pressure previously supplied to the chamber 43 above the diaphragm 44 is vented to atmosphere and consequently the fluid pressure force previously transmitted hydraulically through the service pipe 17 to the lower face of the diaphragm 44 of the valve mechanism 16 at the rear end of the car is removed. Accordingly, the valve 48 of the valve mechanism 16 at the rear end of the car is immediately reseated, if not already reseated as explained above, to cut off further venting of fluid under pressure from the brake pipe therepast to the quick service chambers 57 and 61.

In the same manner, when the pressure of the fluid in the quick service chambers 61 of each valve mechanism 16 increases sufficiently to shift the valve piston 66 upwardly, further quick service reduction is cut off.

As long as the diaphragm valve 88 is maintained unseated due to the valve piston 66 being maintained in its upper position venting the chamber 94 beneath the diaphragm valve 88, no further operation of the service diaphragm 25 will result from the continued reduction of brake pipe pressure, by the brake valve at the head end of the train being maintained in service application position, because the pressure in chambers 26 and 27 reduces at the same rate.

After a certain predetermined time, however, the pressure of the fluid in the quick service chamber 61 acting on the face of the valve piston 66 is vented to atmosphere by way of the branch passage 83, passage 81 and the choke 82 and thus the valve piston 66 is returned downwardly to seated position on the annular rib seat 70 with the result that valves 67 and 68 are returned to unseated and seated positions, respectively. Accordingly, the exhaust of fluid under pressure from the chamber 94 beneath the diaphragm valve 88 is cut off and fluid under pressure is resupplied to chamber 94 past the valve 67 from the chamber 27 and brake pipe. Spring 97 thus returns the diaphragm valve 88 into seated relation on the annular rib seat 98 to close the pressure equalizing communication between the chambers 26 and 27 on opposite sides of service diaphragm 25.

If the pressure in the brake pipe now continues to reduce at a service rate, the service diaphragm 25 is again flexed downwardly to effect another local quick service reduction in brake pipe pressure at the head end of the car and the propagation of a pressure impulse through the service pipe 17 to the valve mechanism 16 at the rear of the car as previously described. Since some fluid under pressure may still be retained in the quick service chambers 57 and 61, the second quick service reduction in brake pipe pressure may not be as great as the first.

If the brake valve at the head end of the train is maintained in service application position sufficiently long, a plurality of quick service reductions will be propagated serially throughout the train at successive spaced intervals of time.

The brake controlling valve device 13 operates in the conventional manner in response to the local quick service reduction of brake pipe pressure on the corresponding car to cause fluid under pressure to be supplied from the auxiliary reservoir 14 to the brake cylinder 15, the degree of pressure established in the brake cylinder corresponding in each instance to the total amount of the reduction in brake pipe pressure resulting after each successive local quick service reduction. Accordingly not only is the application of the brakes on the different cars initiated more nearly simultaneously but also the build-up of pressure in the brake cylinder is faster than in conventional brake equipment.

It will thus be seen that the operator may graduate the service application of the brakes in the same manner as for conventional fluid pressure brake equipment and also may effect a service application of the brakes to any desired degree.

(d) *Release following service application*

If it is desired to release the brakes after a service application, the operator operates the brake valve at the head end of the train in the conventional manner from lap position to release position and then to running position. As is well known, with the brake valve in release position, fluid under pressure is supplied into the brake pipe from the main reservoir to rapidly recharge the brake pipe and, when the brake valve is in running position, at a slower rate under the control of a feed valve which limits the ultimate pressure attained in the brake pipe to a pressure lower than that normally carried in the main reservoir.

The choke 122 in the first valve mechanism 16 reached by the pressure increase in the brake pipe so restricts the charging of the chamber 26 above the service diaphragm 25 thereof as to cause a differential force flexing the service diaphragm upwardly due to the more rapid build-up of pressure in the chamber 27 beneath the service diaphragm 25. As previously stated, the spring 28 is of such strength as to permit upward flexing of the service diaphragm in response to a very slight differential pressure on the diaphragm 25 such as three-quarters of a pound per square inch.

The upward flexing of the diaphragm 25 causes the upper follower disc 37 to engage the stem 166 of the valve 162 and shift the valves 162 and 163 to unseated and seated positions respectively. Fluid under pressure is accordingly vented from the chamber 26 above the service diaphragm 25 past the unseated valve 162, through chamber 161 and passage 171 to the inner seated area of the piston valve 172.

As previously stated the spring 176 is of such strength as to resist downward shifting of the piston valve 172 until the fluid pressure supplied into passage 171 from chamber 26 exceeds a certain pressure, such as seventy-five pounds per square inch. This pressure is selected so that the maximum reduction from normal brake pipe pressure during a service application of the brakes will not cause brake pipe pressure to reduce therebelow. Accordingly since the chamber 26 is charged to the pressure in the brake pipe, sufficient pressure is promptly built up on the inner seated area of piston valve 172 to shift it downwardly to unseat the vent valve 173. Fluid under pressure is thus supplied past the unseated piston valve 172 from the passage 171 to the passage 184 and chamber 185 and, at the same time, fluid under pressure is vented from chamber 203 at the back of the inshot valve piston 197 past vent valve 173 to the chamber 214. The pressure of the fluid supplied to chamber 185 acts on the diaphragm 186 and is accordingly transmitted hydraulically through the release pipe 19 to the chamber 189 beneath the diaphragm 186 of the valve mechanism 16 at the opposite end of the car to cause upward flexing of the latter diaphragm 186 and unseating of its associated valve 193. The unseating of the valve 193 effects the venting of fluid under pressure from chamber 203 at the back of inshot valve piston 197 past the ball check valve 219 to the corresponding chamber 214.

It will thus be seen that the inshot valve piston 197 of valve mechanism 16 at head and rear ends of a car are practically simultaneously shifted downwardly to connect the release reservoirs 21 associated respectively therewith to the corresponding branch pipes 52a and 52 of the brake pipe.

The sudden build-up of pressure in the brake pipe due to the supply of fluid under pressure from the release reservoirs 21 to the brake pipe produces almost instantaneous response of the piston valve 172 of the valve mechanism 16 at the head end of the next succeeding car to vent the chamber 203 at the back of the inshot valve piston 197 thereof and to transmit a pressure impulse through the release pipe 19 to the valve mechanism at the rear of the car in the manner similar to that previously described.

It will thus be seen that the pairs of valve mechanisms 16 on successive cars throughout the train are serially operated to effect local inshots of fluid under pressure into the brake pipe at a plurality of points along the length thereof so that in effect a pressure increase impulse is propagated through the brake pipe at a greater speed than the ordinary speed of propagation of a pressure increase impulse initiated by the brake valve at the head end of the train.

When the inshot piston valve 197 shifts downwardly to supply fluid under pressure from the release reservoir 21 to the brake pipe, the associated valve 207 seats on the annular rib seat 221 to close off the communication from chamber 203 to the bore 211. The combined volume of the chambers 203 and 204 is relatively small and consequently the chambers are promptly charged through the choke 202 in the inshot valve piston 197, by fluid under pressure supplied from the release reservoir 21, to a sufficient degree to enable the spring 198 to shift the inshot valve 197 back to seated position on annular rib seat 199 to cut off the supply of fluid under pressure from the release reservoir to the brake pipe.

The vent valve 227 associated with the valve piston 223 is unseated simultaneously with seating of the valve 207 and accordingly the chamber 232 at the back of the valve piston 223 is vented through the bore 211, passage 212, past either the vent valve 173 or the valve 193 to the volume chamber 214. Accordingly, the valve piston 223 is shifted upwardly and unseated from the annular rib seat 225 to establish communication between the passage 201 and 224 so that fluid under pressure is supplied rapidly from the release reservoir 21 to the chamber 214 to rapidly build-up the pressure therein to the pressure in the release reservoir.

The inner seated area of the piston valve 172 on its lower face is subject to the fluid pressure in the chamber 214 and thus the fluid pressure forces on the piston valve 172 become rapidly sufficiently balanced to enable the spring 176 to shift the piston valve upwardly and reseat it on the annular rib seat 170 before the inshot valve piston 197 is returned upwardly into seated relation on its annular rib seat 199. Consequently, when the inshot valve piston 197 is thereafter reseated on its annular rib seat 199, and the valve 207 associated therewith is again unseated to open communication between the chamber 203 and the bore 211, the chamber 203 is not immediately again vented.

When the valve 207 is unseated, the vent valve 227 is again seated and accordingly since the chamber 232 at the back of the valve piston 223 is of relatively small volume and is charged sufficiently through the choke 231 in the valve piston 223 in a relatively short time, the spring 226 becomes effective to reseat the valve piston 223 to close the connection between the release reservoir 21 and the chamber 214.

When the pressure in the chamber 214 reduces sufficiently, the time required for such decrease in pressure being determined by the volume of the chamber 214 and the size of the exhaust choke 217, the pressure acting in passage 171 on the upper inner seated area of the piston valve 172 again operates the piston valve downwardly to unseat the vent valve 173 and repeat the operation.

It will be observed that with the piston valve 172 in its upper seated position, the chamber 185 above the pressure diaphragm 186 is promptly vented to atmosphere through the choke 188 and, consequently, due to the removal of the fluid pressure on the upper face of the diaphragm 186 of the valve mechanism at the head end of the car, the hydraulic pressure acting in the chamber 189 beneath the diaphragm 186 of the valve mechanism 16 at the opposite end of the car is correspondingly removed and its valve 193 reseated. It will be observed also that the ball check valve 219 prevents reverse flow of fluid under pressure from the chamber 214 through the passage 218.

As long as the brake valve is in release or running position and the pressure in the brake pipe 11 is thereby being increased, the release portion of the valve mechanisms 16 will be serially operated to effect a succession of local inshots or pressure increases in the brake pipe at spaced intervals. When the brake valve is returned to lap position, as it is in a graduated release, the service diaphragm 25 substantially instantaneously returns to its normal position due to the fact that chamber 26 becomes promptly charged to the pressure in the chamber 27 and the brake pipe through choke 122 when the pressure in the brake pipe and chamber 27 ceases to increase due to lapping of the brake valve. Accordingly, the valves 162 and 163 are returned to seated and unseated positions, respectively, so that the passage 171 is vented to atmosphere through the exhaust port 168 past the unseated valve 163. It will accordingly be seen that when the brake valve at the head end of the train is lapped, the local inshots into the brake pipe cease, and that the valve mechanisms 16 are automatically responsive for each successive increment of increase of brake pipe pressure in a graduated release operation to effect a local inshot of fluid under pressure into the brake pipe in advance of the pressure increase impulse initiated at the brake valve.

It should be understood that the release reservoirs 21 are of sufficient capacity in relation to the volume of the brake pipe 11 to supply a limited amount or inshot of fluid under pressure to the brake pipe locally to increase the pressure therein, without excessively draining or reducing the pressure in the release reservoirs. The relative capacities of the release reservoir and brake pipe will be discussed hereinafter at further length in connection with the release of the brakes following an emergency application of the brakes.

When the fluid pressure is increased in the brake pipe 11, the brake controlling valve devices 13 on the cars operate responsively to recharge the auxiliary reservoirs 14 and vent fluid under pressure from the brake cylinders 15. In the case of a complete restoration of the normal pressure in the brake pipe, the auxiliary and supplemental reservoirs are completely recharged to normal pressure and fluid under pressure is completely released from the brake cylinders 15 so that the brakes are completely released. In the case of a graduated release, in which the pressure in the brake pipe is restored in successive steps or increments of pressure, the pressure in the auxiliary reservoirs will be correspondingly recharged and the pressure in the brake cylinders correspondingly reduced to reduce the degree of application of the brakes. Obviously, due to the operation of the release portion of the valve mechanisms 16 to effect successive local inshots in the brake pipe, the brake pipe will be restored more rapidly to its normal pressure and consequently the release of the brakes will be effected more rapidly than in the case of the conventional fluid pressure brake system. The rapid response of the brakes enables close regulation of the speed of the train so that unnecessary slow down can be avoided and faster traveling schedules maintained.

In the embodiment of my invention shown, the release portions of the valve mechanisms 16 at opposite ends of a car are associated hydraulically to effect propagation of a brake release impulse serially through the train at a greater speed than the pressure increase impulse initiated by the brake valve. However, I wish to point out that these release portions are effective to accelerate the release when the hydraulic connection is not employed, and they could therefore be incorporated in a conventional fluid pressure brake system and when so incorporated would respond to the pneumatic pressure impulse alone and be effective to increase the rate of build-up in the brake pipe upon release of the brakes.

Thus, if in the system here illustrated the release pipe 19 on one or more of the cars should be broken and the hydraulic transmission of an impulse from one end of the car to the other fail, the release portions of the valve mechanisms 16 nevertheless respond to the pneumatic impulse in the brake pipe and function to accelerate the build-up of pressure in the brake pipe at a greater rate than in conventional fluid pressure brake equipment, and accordingly cause a more rapid release of the brakes throughout the train than would be effected in the case of conventional fluid pressure brake equipment. It should be understood, therefore, that my invention contemplates the provision of valve mechanisms corresponding to the release portions of the valve mechanisms 16 without any hydraulic connection between the valve mechanisms at opposite ends of the car. It is deemed unnecessary to show such an arrangement in a view separate from that of Fig. 1 since the arrangement will be readily understood from the above explanation.

(e) Emergency application of the brakes

When it is desired to effect an emergency application of the brakes, the brake valve at the head end of the train is operated to emergency position to effect an emergency rate of reduction of pressure in the brake pipe 11. Upon a reduction of the pressure in the brake pipe at an emergency rate at the head end of the train, the emergency diaphragm 110 of the valve mechanism 16 at the head end of the first car is urged downwardly to unseat and seat the valves 131 and 132, respectively, due to the differential fluid pressure force created on the diaphragm. Fluid under pressure is accordingly locally vented from the chamber 112 and the connected brake pipe past the unseated valve 131 through chamber 134 and passage 141 to the chamber 142 above the pressure diaphragm 143. The pressure of the fluid in the chamber 142 is transmitted hydraulically through the emergency pipe 18 to the chamber 145 beneath the diaphragm 143 of the valve mechanism 16 at the opposite end of the car, and causes the diaphragm to be correspondingly flexed upwardly to unseat its associated valve 151. Valve 151 is of relatively large area and consequently requires but a slight unseating movement to cause rapid venting of fluid under pressure from the brake pipe to atmosphere through branch pipe and passage 52, chamber 148, and the exhaust passage 149.

Since the emergency diaphragm 110 is flexed downwardly in response to a very slight differential of pressure in chambers 111 and 112, it will be apparent that almost instantly upon the operation of the brake valve to emergency position, the emergency portion of the valve mechanisms 16 at opposite ends of the first car are operated to locally vent the brake pipe at a rapid rate and that the valve mechanisms 16 on succeeding cars are serially operated in response to the local reduction of brake pipe pressure on the preceding car so that the speed of propagation of the emergency reduction through the brake pipe is much faster than the speed of the pressure reduction initiated by the brake valve at the head end of the train.

It will be apparent that as long as the brake valve at the head end of the train remains in emergency position, the pressure in the brake pipe continues to decrease at an emergency rate and that consequently the emergency portion of the valve mechanisms 16 will remain conditioned to locally vent the brake pipe.

As in the conventional fluid pressure brake system, each of the brake controlling valve devices 13 on the cars operates in response to the emergency reduction of the brake pipe pressure to effect the supply of fluid under pressure from the auxiliary reservoir 14 to the brake cylinder 15 at an emergency rate, the ultimate pressure established in the brake cylinder being the pressure of equalization between the auxiliary reservoirs and the corresponding brake cylinders. Obviously, since the valve mechanisms 16 on the cars operate to locally reduce the pressure in the brake pipe at a plurality of points along the length thereof and thus effect acceleration of the speed of propagation of pressure reduction, it will be apparent that the application of the brakes on the cars at the rear end of the train will not lag behind the application of the brakes at the head end of the train by as a long a time interval as in the case of convention brake equipment. Accordingly the run-in of slack in trains of existing non-articulated cars operating in high speed service will be tolerable due to the more nearly simultaneous application of the brakes on the cars throughout the train.

Since the service portion of each of the valve mechanisms 16 responds to a service rate of reduction in brake pipe pressure, it also operates in response to an emergency rate of reduction in brake pipe pressure. Accordingly, in an emergency application of the brakes, the service and emergency portions function simultaneously to locally vent the brake pipe and propagate pressure reduction impulses hydraulically throughout the train. The fact that the service portion of the valve mechanism 16 responds to the emergency reduction of brake pipe pressure is unobjectionable since the operation of the service portion simply aids in reducing the brake pipe pressure and in hydraulically propagating a pressure reduction impulse in the brake pipe.

In view of the fact that the fluid under pressure in the brake pipe 11 is eventually completely vented to atmosphere in an emergency application of the brakes, it will be seen that ultimately the fluid under pressure in the chambers 111 and 112 on opposite sides of the emergency diaphragm 110 and in the chambers 26 and 27 on the opposite sides of the service diaphragm 25 will be vented to atmosphere and the diaphragms respectively returned to the normal or neutral positions thereof. Upon the return of the emergency diaphragm 110 to its normal position, the valves 131 and 132 are respectively seated and unseated and consequently the fluid under pressure in the chamber 142 above the pressure diaphragm 143 of the valve mechanism 16 at the head end of a car is released through the atmospheric exhaust port 137 past the unseated valve 132, thereby relieving the pressure in the chamber 145 at the lower side of the pressure diaphragm 143 of the valve mechanism 16 at the opposite end of the car and causing valve 151 associated with the latter diaphragm 143 to be reseated. In a similar manner valves 31 and 32 associated with the service diaphragm 25 are returned to seated and unseated positions and venting of fluid under pressure from the brake pipe to the quick service volume cut off. Thus the valve mechanisms 16 are automatically reconditioned so that recharging of the brake pipe may be effected to effect the release of the brakes.

*(f) Release following emergency application*

To effect release of the brakes following an emergency application of the brakes, the usual brake valve, not shown, is operated in the conventional manner from emergency position to release position to initially charge the brake pipe at a rapid rate directly from the main reservoir and then to running position to further charge the brake pipe to its normal pressure at a slower rate under the control of the feed valve. Since the main reservoir is charged normally to a much higher pressure than the normal pressure in the brake pipe, it is necessary that the brake valve be shifted to running position in order to prevent overcharge of the brake pipe and the consequent undesired reapplication of the brakes.

Since the auxiliary reservoir pressure reduces during an emergency application of the brakes to the pressure of equalization with the brake cylinder, the pressure in the brake pipe must first be restored to a pressure higher than such pressure in order to cause operation of the brake controlling valve devices 13 to release position to initiate the release of fluid under pressure from the brake cylinder and the consequent release of the brakes following an emergency application of the brakes. The pressure to which auxiliary pressure may be reduced during an application of the brakes under the assumed conditions may be of the order of fifty or sixty pounds per square inch.

With the brake valve in release position supplying fluid under pressure from the main reservoir at a rapid rate into the brake pipe, such pressure is rapidly attained in the brake pipe and accordingly the brake controlling valve devices are rapidly serially operated in response to the increase in pressure in the brake pipe to release position to initiate the release of the brakes on the cars.

With the brake valve in running position causing charging of the brake pipe under the control of the feed valve, the restoration of the pressure in the brake pipe to its normal pressure is at a relatively slow rate and thus in conventional fluid pressure brake equipments considerable time is consumed in completely releasing the brakes following an emergency application thereof.

In my invention, the release portion of each of the valve mechanisms 16 operates as in the case of a release of the brakes following a service application when the pressure in the brake pipe is restored sufficiently to unseat the piston valve 172 to cause a succession of local inshots into the brake pipe to increase the rate of build-up of pressure in the brake pipe to a rate comparable to the rapid rate of recharge with the brake valve in release position.

It will be apparent that during a service or emergency application of the brakes the release reservoirs 21 remain charged to the normal pressure carried in the brake pipe and, as assumed previously, such pressure may be of the order of 110 pounds per square inch. Furthermore, as previously stated in connection with the release of the brakes following a service application, the capacity of the release reservoirs 21 is sufficiently large in relation to the volume of the brake pipe that the reduction of the pressure in the release reservoirs due to the local supply therefrom to the brake pipe during the release operation is only a small percentage of the normal pressure. For example, if the release reservoirs are normally charged to a pressure of 110 pounds per square inch, a reduction to only 103 pounds per square inch pressure may result due to the local supply therefrom to the brake pipe during the release operation.

It will thus be apparent that during the initiation of the release of the brakes following an emergency application and for the major portion of the interval during which the brake pipe is being charged with fluid under pressure, the release reservoirs 21 are charged to a pressure higher than that in the brake pipe and consequently no fluid under pressure is supplied thereto past the check valves 22. Thus, until the fluid under pressure is substantially completely vented from the brake cylinder, the release reservoirs 21 do not constitute a drain on the brake pipe and consequently do not in any way impede or render sluggish the propagation of a pressure increase impulse through the brake pipe to initiate release of the brakes, or impede or render sluggish the continued release of fluid under pressure from the brake cylinder.

When the pressure in the brake pipe 11 is restored to a degree higher than the reduced pressure in the release reservoirs 21, fluid under pressure is supplied past the check valves 22 to restore the pressure in the release reservoirs to the normal pressure carried therein.

It will thus be seen that my invention effects the rapid restoration of the brake pipe to its normal pressure in a much shorter time than in conventional fluid pressure brake equipment and that accordingly a portion of the time ordinarily required in the case of conventional fluid pressure brake equipment for releasing the brakes is saved due to the continued rapid release of fluid under pressure from the brake cylinder throughout the release operation.

It will be apparent that since a fluid pressure of at least 75 pounds per square inch is required to unseat piston valve 172 of the valve mechanisms 16, local inshots into the brake pipe do not begin until such time as it is required in order to maintain the rapid rate of build-up in the brake pipe after the brake valve is shifted to running position from release position.

In conventional fluid pressure brake equipment, the rapid in-rush of fluid under pressure from the main reservoir into the brake pipe at the head end of the train with the brake valve in release position temporarily builds-up the pressure in the brake pipe at the head end of the train to a degree in excess of the normal pressure in the brake pipe, which pressure reduces automatically, that is "runs away," due to the flow of fluid under pressure toward the rear end of the train in the brake pipe when the brake valve is shifted to running position.

Accordingly, in order to prevent overcharging of the diaphragm chambers 26 and 111 above the service diaphragm 25 and emergency diaphragm 110 of the valve mechanism 16, the one-way check valves 120 are provided in the charging communication for these chambers to restrict the charging of the chambers to a rate determined by the flow area of the choke 116 alone. Furthermore, during the release of the brakes following either a service or an emergency application the upward flexing of the service diaphragm 25 to unseat and seat the valves 163 and 162, respectively, connects the passage 171 to the chamber 26 above the service diaphragm 25 and thus to some extent enlarges its volume to mitigate the effect of overcharging. In addition, when the piston valve 172 is unseated, the chamber 26 is connected through the passage 184 to the chamber 185, above the pressure diaphragm 186, which chamber is in turn connected to atmosphere through the passage 187 containing the choke 188. Thus, during the charging of the brake pipe to effect release of the brakes following an emergency application, the chambers 26 and 111 above the diaphragms 25 and 110, respectively, are connected to atmosphere through the choke 188 at intervals and consequently any overcharge occurring therein is dissipated. The chambers 26 and 111 are of relatively small size, such as 40 or 50 cubic inches in order to enable dissipation of the overcharge by the relatively small choke 188.

It is desirable to avoid excessive dissipation or diminution of the pressure in the chambers 26 and 111 by way of the choke 188 and, accordingly, the spring 104 for loading the check valve 102 is so selected that when differential pressure on the diaphragms 25 and 110 exceeds a certain value, the check valve acts to supply fluid under pressure therepast to the chambers 26 and 111.

SUMMARY

Summarizing, it will be seen that I have disclosed a fluid pressure operated railway train brake equipment of the type in which the brakes are controlled by variations of pressure in a brake pipe extending throughout the train and characterized, according to my invention, by accelerating means for increasing the speed of operation of the brakes and also effecting more nearly simultaneous application of the brakes on the cars throughout the train as compared to conventional fluid pressure brake equipment.

In the embodiment shown, a pair of valve mechanisms are provided for each car located respectively at opposite ends of the car and associatively connected by hydraulic connecting means so as to operate substantially simultaneously in response to variations of pressure in the brake pipe initiated in the conventional manner by a brake valve at the head end of the train. The valve mechanisms operate selectively in response to service and emergency rates of reduction of pressure in the brake pipe to locally vent fluid under pressure from the brake pipe at a service rate or at an emergency rate, and in response to recharging of the brake pipe to effect local inshots of fluid under pressure into the brake pipe. The operation of the valve mechanisms on one car is effective to vary the pressure in the brake pipe to cause operation of the valve mechanisms on the next succeeding car. The valve mechanisms on succeeding cars throughout the train are thus serially operated and a brake control impulse propagated throughout the train at a much faster rate than is possible in conventional fluid pressure brake equipment.

Each of the valve mechanisms provided according to my invention embodies a service portion, an emergency portion and a release portion. The service portion is operative automatically in response to a service rate of reduction of brake pipe pressure to effect a succession of local quick service reductions in brake pipe pressure as long as the brake valve at the head end of the train is in service position, the local quick service reductions ceasing automatically when the brake valve is shifted to lap position.

In an emergency application of the brakes, the emergency portion of the valve mechanisms functions to effect a local reduction of brake pipe pressure at an emergency rate and the service portions also function to effect a succession of local quick service reductions in brake pipe pressure.

When the brake pipe is recharged to effect release of the brakes following a service application, the release portions of the valve mechanisms function automatically to effect a succession of local inshots into the brake pipe, the inshots ceasing whenever the brake valve at the head end of the train is shifted to lap position. Accordingly, the valve mechanism are effective to accelerate the propagation of a release impulse throughout the train for each successive increment or step in a graduated release of the brakes.

During a release of the brakes following an emergency application, the release portion of the valve mechanism becomes effective to cause local inshots of fluid under pressure into the brake pipe after the brake pipe pressure has been restored sufficiently to initiate the release of fluid under pressure from the brake cylinder, thereby maintaining the rapid rate of build-up in the brake pipe and accelerating the release of the brakes.

The valve mechanisms provided according to my invention are of such nature as to guard against undesired applications of the brakes following the release of the brakes due to overcharging of the brake pipe.

In the embodiment shown, the valve mechanisms at opposite ends of each car are associated by hydraulic connecting means to effect substantially simultaneous operation thereof but it should be understood that any other suitable connecting means, mechanical or electrical, may be provided to cause simultaneous operation of the two valve mechanisms.

In the case of the specific embodiment shown in which hydraulic pipes connect the valve mechanisms at opposite ends of the car, the hydraulic medium is preheated to a temperature in excess of the maximum service temperature and then sealed within the pipes, thus providing room for expansion of the hydraulic medium under service conditions. If desired an expansion device applicable to each hydraulic pipe may be provided, according to my invention, adapted to remove excess hydraulic medium from the pipe upon expansion of medium due to increase in service temperatures and to automatically restore hydraulic medium to the pipe upon reduction of service temperatures, without in any way interfering with the propagation of brake control impulses from the valve mechanism at one end of the car to the valve mechanism at the other end of the car.

The maximum acceleration of brake operation is obtained when the valve mechanisms provided at opposite ends of the car according to my invention are associatively connected so as to operate simultaneously independently of the propagation of a pressure variation impulse through the brake pipe from one end of the car to the other. However, the hydraulic or equivalent connections between the valve mechanisms may be omitted and the valve mechanisms associatively connected through the brake pipe only. In such case, the valve mechanisms operate in some measure to accelerate the propagation of a brake control impulse and increase the rapidity of operation of the brakes as compared to conventional fluid pressure brake equipment although not to the extent possible when associatively connected independently of the brake pipe as by hydraulic or equivalent connecting means.

While my invention has been illustrated in specific form it will, therefore, be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. In a train brake equipment of the type having a brake pipe normally charged with fluid under pressure and extending through all the cars of the train, and brake controlling valve devices on the cars operatively controlled by variations in pressure in the brake pipe for controlling the brakes on the cars; two valve devices for each car located respectively at opposite ends of the car and operatively responsive to variations of pressure in the brake pipe, means providing three separate hydraulic connections between the two valve devices, one of the valve devices on each car being operative in response to an increase of pressure or a plurality of different rates of pressure decrease set up in the brake pipe to transmit a pressure impulse selectively over that one of the hydraulic connections corresponding to the type of pressure variation to the other valve device to cause it to produce a variation in the brake pipe corresponding to that which produced the operation of said one valve device whereby the valve devices on successive cars are serially operated to propagate a variation impulse in brake pipe pressure at a faster rate than the initiating pressure variation.

2. In a train brake equipment of the type having a brake pipe normally charged with fluid under pressure and extending through all the cars of the train, and brake controlling valve devices on the cars of the train operatively responsive to a reduction of pressure in the brake pipe at a service rate to effect a service application of the brakes, responsive to reduction of the pressure in the brake pipe at an emergency rate to effect an emergency application of the brakes and responsive to restoration of the pressure in the brake to the normal pressure following an application of the brakes for effecting release of the brakes; two valve devices for each car located respectively at opposite ends of the car, means providing three separate passages constituting hydraulic connecting means between the two valve devices on each car, one of said valve devices on a car being responsive to a service rate of reduction of brake pipe pressure to transmit a pressure impulse hydraulically over one of said passages to the other valve device to cause it to operate to effect a reduction of the pressure in the brake pipe locally at a service rate, responsive to the reduction of the pressure in the brake pipe at an emergency rate to cause the propagation of a pressure impulse hydraulically over another of said passages to the other valve device to cause it to operate to effect a local reduction of brake pipe pressure at an emergency rate and operatively responsive to an increase in pressure in the brake pipe to hydraulically propagate a pressure impulse over the third of said passages to the other of said valve devices to cause it to operate to locally supply fluid under pressure to the brake pipe.

3. In a car brake equipment of the type having a brake pipe and a brake controlling valve device operatively controlled by variations of pressure in the brake pipe for controlling the brakes on the car; two valve mechanisms located respectively at opposite ends of the car, means associating the two valve mechanisms whereby to cause substantially instantaneous duplicate operation of one valve device in response to the operation of the other, either of said valve mechanisms being operated in response to a service reduction of brake pipe pressure to locally vent fluid under pressure from the brake pipe at a service rate, responsive to an emergency reduction of brake pipe pressure to locally vent fluid under pressure from the brake pipe at an emergency rate, and responsive to an increase of pressure in the brake pipe for locally supplying fluid under pressure to the brake pipe.

4. In a car brake equipment of the type having a brake pipe normally charged with fluid under pressure and a brake controlling valve device operatively responsive to variations of the pressure in the brake pipe for controlling the brakes on the car; two valve mechanisms located respectively at opposite ends of the car and each having a corresponding chamber therein, means providing a passage connecting the said chambers of the two valve mechanisms, said chambers and passage being filled with a hydraulic medium, said valve mechanisms each comprising a fluid pressure responsive element operatively responsive to a reduction of the pressure in the brake pipe for effecting the application of pressure to the hydraulic medium, valve means operated by the fluid pressure responsive means for locally venting fluid under pressure from the brake pipe, and additional valve means independent of said fluid pressure responsive means and operated only in response to a pressure impulse hydraulically transmitted thereto for also locally venting fluid under pressure from the brake pipe.

5. In a car brake equipment of the type having a brake pipe normally charged with fluid under pressure and a brake controlling valve device operatively responsive to variations of the pressure in the brake pipe for controlling the brakes on the car; the combination of two valve mechanisms located respectively at opposite ends of the car, means separate from the brake pipe connecting said valve mechanisms for causing one valve mechanism to operate instantaneously in correspondence with the operation of the other valve mechanism, each of said valve mechanisms comprising a fluid pressure responsive means operative in response to a service reduction of pressure in the brake pipe for locally venting fluid under pressure from the brake pipe at a service rate and for propagating an impulse over said connecting means to cause duplicate operation of the other valve mechanism, and a second fluid pressure responsive means separate from said first fluid pressure responsive means operative in response to an emergency reduction of pressure in the brake pipe for locally venting fluid under pressure from the brake pipe at an emergency rate and for propagating an impulse over said connecting means to the other valve mechanism to cause duplicate operation thereof.

6. In a car brake equipment of the type having a brake pipe normally charged with fluid under pressure and a brake controlling valve device operatively responsive to variations of the pressure in the brake pipe for controlling the brakes on the car; the combination of two valve mechanisms located respectively at opposite ends of the car, means independent of the brake pipe associating said valve mechanisms so as to cause simultaneous operation of both, each of said valve mechanisms having a diaphragm subject to the opposing pressures of fluid supplied to chambers on opposite sides thereof from the brake pipe and having also a quick service chamber, each diaphragm being operatively responsive to a reduction of brake pipe pressure at a certain rate for effecting a local venting of fluid under pressure from the brake pipe to said quick service chamber and also the operation of the other valve mechanism through said associating means, each valve mechanism having also means operated in response to operation of the other valve mechanism through said associating means for locally venting fluid under pressure from the brake pipe to its corresponding quick service chamber.

7. In a car brake equipment of the type having a brake pipe normally charged with fluid under pressure and a brake controlling valve device operatively responsive to variations of the pressure in the brake pipe for controlling the brakes on the car; the combination of two valve mechanisms located respectively at opposite ends of the car, hydraulic means associating said valve mechanisms, each of said valve mechanisms having a diaphragm subject to the opposing pressures of fluid supplied to chambers on opposite sides thereof from the brake pipe and having also a quick service chamber, each diaphragm being operatively responsive to a reduction of brake pipe pressure at a certain rate for effecting a local venting of fluid under pressure from the brake pipe to said quick service chamber and also the transmission of a pressure impulse over the hydraulic associating means to the other valve mechanism, each valve mechanism having also fluid pressure responsive means subject to a pressure impulse received from the other valve mechanism for locally venting fluid under pressure from the brake pipe to its quick service chamber, each valve mechanism having also means responsive to a certain pressure in the quick service chamber thereof for effecting a rapid equalization of the pressures in the chambers at opposite sides of said diaphragm for causing said diaphragm to return to its normal position and terminate the local venting of fluid under pressure from the brake pipe and the transmission of a pressure impulse to the other valve mechanism.

8. In a car brake equipment of the type having a brake pipe normally charged with fluid under pressure and a brake controlling valve device operatively responsive to variations of the pressure in the brake pipe for controlling the brakes on the car; the combination of two valve mechanisms located respectively at opposite ends of the car; hydraulic means associating said valve mechanisms, each of said valve mechanisms having a diaphragm subject to the opposing pressures of fluid supplied to chambers on opposite sides thereof from the brake pipe and having also a quick service chamber, each diaphragm being operatively responsive to a reduction of brake pipe pressure at a certain rate for effecting a local venting of fluid under pressure from the brake pipe to said quick service chamber and also the transmission of a pressure impulse over said hydraulic means to the other valve mechanism, each valve mechanism having also fluid pressure responsive means subject to a pressure impulse received from the other valve mechanism for locally venting fluid under pressure from the brake pipe to its quick service chamber, each valve mechanism having also means responsive to a certain pressure in the quick service chamber thereof for effecting rapid equalization of the pressures in the chambers at opposite sides of said diaphragm for causing said diaphragm to return to its normal position and terminate the local venting of fluid under pressure from the brake pipe and the transmission of a pressure impulse to the other valve mechanism, and timing means for rendering said last means noneffective to equalize the pressures in the chambers on opposite sides of said diaphragm after a predetermined time.

9. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, said valve mechanisms having corresponding connected chambers filled with a hydraulic medium and a diaphragm associated with said chambers for applying pressure to and being subject to the pressure of the hydraulic medium, each of said valve mechanisms also having means operatively responsive to a reduction of pressure in the brake pipe for supplying fluid under pressure from the brake pipe to act on said diaphragm, and means operated in response to the application of hydraulic pressure to the diaphragm for locally venting fluid under pressure from the brake pipe.

10. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, said valve mechanisms having corresponding chambers hydraulically connected and also corresponding other chambers respectively, valve means operatively responsive to the increase of pressure in the brake pipe for locally supplying fluid under pressure from the brake pipe to said other chamber, fluid pressure responsive means subject to the pressure in the said other chamber for applying a pressure to the hydraulic medium in said first chamber, means operatively controlled by the said valve means for causing fluid under pressure to be supplied locally to the brake pipe, and means responsive to the hydraulic pressure in the first mentioned chamber for also causing fluid under pressure to be locally supplied to the brake pipe.

11. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, means independent of the brake pipe operatively associating said valve mechanisms to cause substantially simultaneous duplicate operation thereof, a normally charged reservoir associated with each of said valve mechanisms, each of said valve mechanisms being operative in response to an increase of pressure in the brake pipe for supplying fluid under pressure from the associated reservoir to the brake pipe.

12. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, a reservoir associated with each of said valve mechanisms normally charged with fluid under pressure, each of said valve mechanisms having a valve device operative to supply fluid under pressure from the associated reservoir to the brake pipe, means operatively responsive to an increase of pressure in the brake pipe for effecting operation of said valve device to supply fluid under pressure from the said reservoir to the brake pipe, means operative in response to an increase of pressure in the brake pipe for transmitting an impulse independently of the brake pipe to the other valve mechanism, and means operative in response to the impulse received for also causing operation of said valve device of the corresponding valve mechanism to supply fluid under pressure from the reservoir to the brake pipe.

13. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, a reservoir associated with each of said valve mechanisms, a communication including a one-way valve enabling the charging of said reservoir from the brake pipe, each of said valve mechanisms having a valve device operative to cause fluid under pressure to be supplied from said reservoir to the brake pipe, means operative in response to an increase of pressure in the brake pipe for effecting operation of said valve device, and means associating said valve mechanisms independently of the brake pipe for causing operation of the valve device of one valve mechanism to supply fluid under pressure from the reservoir to the brake pipe substantially instantaneously upon the operation of the valve device of the other valve mechanism to supply fluid under pressure from its associated reservoir to the brake pipe.

14. In a car brake equipment of the type having a brake pipe normally charged with fluid under pressure and a brake controlling valve device operatively responsive to variations of pressure in the brake pipe for controlling the brakes on the car; the combination of a movable abutment operatively responsive to an increase of pressure in the brake pipe, an inshot valve device effective, when operated, to supply a limited amount of fluid under pressure locally into the brake pipe, means operated in response to the operation of the movable abutment due to an increase in pressure in the brake pipe for initiating the operation of the inshot valve means to supply fluid under pressure locally to the brake pipe, and means effective upon operation of the inshot valve device to supply fluid under pressure locally into the brake pipe for conditioning said last means to be unresponsive to the operation of the movable abutment in response to a continued increase of pressure in the brake pipe for a limited time.

15. In a car brake equipment of the type having a brake pipe normally charged with fluid under pressure and a brake controlling valve device operatively responsive to variations in pressure in the brake pipe for controlling the brakes on the car; the combination of a movable abutment subject to the opposing pressures of fluid in chambers at opposite sides thereof, one of which chambers has an unrestricted communication with the brake pipe and the other of which has a restricted communication with the brake pipe whereby upon an increase in pressure in the brake pipe said abutment is shifted out of a normal position, means operated in response to the shifting of the abutment due to an increase of pressure in the brake pipe for effecting a local supply of fluid under pressure to the brake pipe, and means for limiting the degree of differential between the pressures in the chambers on opposite sides of said abutment upon an increase of pressure in the brake pipe.

16. In a car brake equipment of the type having a brake pipe normally charged with fluid under pressure and a brake controlling valve device operatively responsive to variations of pressure in the brake pipe for controlling the brakes on the car; a valve mechanism including a flexible diaphragm with chambers on opposite sides thereof, one of which chambers has unrestricted communication with the brake pipe and the other of which has a constantly open restricted communication with the brake pipe whereby upon an increase of pressure in the brake pipe the diaphragm is flexed out of its normal position, and means operated in response to the flexing of the diaphragm as a result of an increase of brake pipe pressure for effecting the local supply of fluid under pressure to the brake pipe.

17. In a car brake equipment of the type having a brake pipe normally charged with fluid under pressure and a brake controlling valve device operatively responsive to variations of pressure in the brake pipe for controlling the brakes on the car; a valve mechanism including a flexible diaphragm with chambers on opposite sides thereof, one of which chambers has an unrestricted communication with the brake pipe and the other of which has a constantly open restricted communication with the brake pipe whereby upon an increase of pressure in the brake pipe it is flexed out of its normal position, means operated in response to the flexing of the diaphragm as a result of an increase in brake pipe pressure for effecting the local supply of fluid under pressure to the brake pipe, and a loaded check valve for limiting the differential of the pressure in the said one chamber over that in the said other chamber.

18. In a car brake equipment of the type having a brake pipe normally charged with fluid under pressure and a brake controlling valve device operatively responsive to variations of pressure in the brake pipe for controlling the brakes on the car; a valve mechanism having a movable abutment subject to the opposing pressures of fluid in chambers on opposite sides thereof, one of said chambers having an unrestricted communication from the brake pipe and the other chamber having a restricted communication from the brake pipe, said abutment being normally in a certain position and shiftable in opposite directions out of said position in response to reduction and increase in the pressure in the brake pipe at rates exceeding certain uniform rates, means operated in response to the operation of the movable abutment due to a reduction of pressure in the brake pipe for locally venting fluid under pressure to the brake pipe, and means operated in response to the operation of the said abutment due to an increase in pressure in the brake pipe for venting fluid under pressure from the chamber at one side of said abutment having the restricted communication with the brake pipe whereby to prevent overcharging of said chamber and a consequent undesired reapplication of the brakes following a release of the brakes.

19. In a car brake equipment of the type having a brake pipe normally charged with fluid under pressure and a brake controlling valve device operatively responsive to variations of pressure in the brake pipe for controlling the brakes on the car; a reservoir normally charged with fluid under pressure, valve means operatively responsive to an increase of pressure in the brake pipe for periodically supplying fluid under pressure from the reservoir to the brake pipe as long as the pressure in the brake pipe continues to increase, and timing means for determining the interval between the successive operations of the valve means to supply fluid under pressure from the reservoir to the brake pipe.

20. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, two reservoirs normally charged with fluid under pressure and associated respectively with each of said valve mechanisms, each of said valve mechanisms having a valve device operative to supply fluid under pressure from the associated reservoir to the brake pipe, a flexible diaphragm having a chamber at one side thereof connected through a communication, filled with a hydraulic medium, with the corresponding chamber of the other valve mechanism, means operative in response to an increase of pressure in the brake pipe for effecting operation of the said valve device to supply fluid under pressure from the associated reservoir to the brake pipe and for causing fluid under pressure to be supplied to exert a pressure on the said flexible diaphragm thereof whereby such pressure is hydraulically transmitted to the flexible diaphragm of the other valve mechanism, and a valve operated by the flexible diaphragm in response to the hydraulic pressure exerted thereon for also effecting operation of the said valve device to cause fluid under pressure to be supplied from the associated reservoir to the brake pipe.

21. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, two reservoirs normally charged with fluid under pressure and associated respectively with each of said valve mechanisms, each of said valve mechanisms having a valve device effective when operation thereof is initiated for supplying fluid under pressure from the associated reservoir to the brake pipe for a limited time, a flexible diaphragm having a chamber at one side thereof connected through a communication, filled with a hydraulic medium, with the corresponding chamber of the other valve mechanism, control means operative in response to an increase of pressure in the brake pipe for initiating operation of the said valve device to supply fluid under pressure from the associated reservoir to the brake pipe and for causing fluid under pressure to be supplied to exert a pressure on the said flexible diaphragm thereof whereby such pressure is hydraulically transmitted to the flexible diaphragm of the other valve mechanism, a valve operated by the hydraulic pressure exerted thereon for also initiating operation of the said valve device to cause fluid under pressure to be supplied from the associated reservoir to the brake pipe, and means rendered effective when the said valve device is operated to supply fluid under pressure from the associated reservoir to the brake pipe for restoring said control means to its position for preventing subsequent operation of the valve device and for closing off the supply of fluid under pressure to the said diaphragm for a limited time.

22. In a car brake equipment of the type having a brake pipe normally charged with fluid under pressure and a brake controlling valve device operatively responsive to variations of pressure in the brake pipe for controlling the brakes on the car; the combination of two valve mechanisms located respectively at opposite ends of the car, a separate reservoir normally charged with fluid under pressure associated with each of said valve mechanisms, each of said valve mechanisms having a valve device effective when operation thereof is initiated for supplying fluid under pressure from its associated reservoir to the brake pipe for a limited time, a flexible diaphragm having a chamber at one side thereof connected through a communication, filled with a hydraulic medium, with the corresponding chamber of the other valve mechanism, control means operative in response to an increase of pressure in the brake pipe for initiating operation of the said valve device to supply fluid under pressure from the reservoir to the brake pipe and for causing fluid under pressure to be supplied to exert a pressure on the said flexible diaphragm thereof whereby such pressure is hydraulically transmitted to the flexible diaphragm of the other valve mechanism, a valve operated by the flexible diaphragm in response to the hydraulic pressure exerted thereon for also initiating operation of the said valve device to cause fluid under pressure to be supplied from the said reservoir to the brake pipe, means rendered effective when the said valve device is operated to supply fluid under pressure from the reservoir to the brake pipe for restoring said control means to its position for preventing subsequent operation of said valve device and for closing off the supply of fluid under pressure to the said diaphragm, and timing means for preventing for a limited time the subsequent operation of the said control means in response to a continued increase in brake pipe pressure.

23. In a car brake equipment of the type having a brake pipe normally charged with fluid under pressure and a brake controlling valve device operatively responsive to variations of pressure in the brake pipe for controlling the brakes on the car; a valve mechanism comprising a movable abutment operatively responsive to a reduction of pressure in the brake pipe, and means set in operation in response to the operation of said movable abutment due to a reduction of pressure in the brake pipe pressure for locally venting fluid under pressure from the brake pipe in a succession of spaced recurrent intervals of limited duration as long as the pressure in the brake pipe continues to reduce.

24. In a car brake equipment of the type having a brake pipe normally charged with fluid under pressure and a brake controlling valve device operatively responsive to variations of the pressure in the brake pipe for controlling the brakes on the car; a valve mechanism having a quick service chamber, means operative in response to a reduction of brake pipe pressure for locally venting fluid under pressure from the brake pipe to said chamber, means responsive to the pressure in said chamber for terminating the local venting of fluid under pressure to said chamber, and means for reducing the pressure in said chamber at a certain rate to render said last means ineffective to prevent further local venting of fluid under pressure from the brake pipe to said chamber after a certain interval of time.

25. In a car brake equipment of the type having a brake pipe normally charged with fluid under pressure and a brake controlling valve device operatively responsive to variations of pressure in the brake pipe for controlling the brakes on the car, the combination of a movable abutment operatively responsive to an increase in the pressure in the brake pipe, a local source of fluid under pressure on the car, valve means operated in response to the operation of the abutment caused by an increase of pressure in the brake pipe for effecting the supply of fluid under pressure from said source to the brake pipe, and means effective to cause said valve means to cut off the supply of fluid under pressure from said source to the brake pipe after a limited time and prior to equalization of the fluid pressure in said source and in the brake pipe notwithstanding a continuing increase of pressure in the brake pipe.

26. In a car brake equipment of the type having a brake pipe normally charged with fluid under pressure and a brake controlling valve device operatively responsive to variations of the pressure in the brake pipe for controlling the brakes on the car, the combination of a local source of fluid under pressure on the car, means operatively responsive to an increase of pressure in the brake pipe, and means set in operation by said responsive means upon an increase of pressure in the brake pipe for supplying fluid under pressure from said source to the brake pipe in a succession of spaced recurrent intervals of limited duration as long as the pressure in the brake pipe increases.

27. In a car brake equipment of the type having a brake pipe normally charged with fluid under pressure and a brake controlling valve device of the graduated release type operatively responsive to reductions of pressure in the brake pipe for effecting applications of the brakes on the cars and operatively responsive to successive increments of pressure increase in the brake pipe for correspondingly graduating the release of the brakes, the combination of a source of fluid under pressure local to the car, valve means set in operation in response to each successive increment of pressure increase in the brake pipe for supplying fluid under pressure from said local source to the brake pipe, and means effective to cause said valve means to terminate the supply of fluid under pressure from said source to the brake pipe during any increment of pressure increase in the brake pipe after a certain limited time.

28. In a car brake equipment of the type having a brake pipe normally charged with fluid under pressure and a brake controlling valve device operatively responsive to variations of the pressure in the brake pipe for controlling the brakes on the car, the combination of a movable abutment operative in response to a differential fluid pressure created thereon in response to a reduction of brake pipe pressure, valve means operated by said abutment for locally venting fluid under pressure from the brake pipe, a valve operative to establish communication between opposite sides of said abutment for effecting equalization of the fluid pressure on opposite sides of said abutment and thereby cause said abutment to effect operation of the valve means to terminate further local venting of fluid under pressure from the brake pipe, and means operative in response to the pressure of the fluid locally vented from the brake pipe by said valve means for effecting operation of said valve.

29. In a car brake equipment of the type having a brake pipe normally charged with fluid under pressure and a brake controlling valve device operatively responsive to variations of pressure in the brake pipe for controlling the brakes on the car, the combination of a movable abutment operative in response to a differential fluid pressure created thereon in response to a reduction of brake pipe pressure, valve means operated by said abutment for locally venting fluid under pressure from the brake pipe, a valve operative to establish communication between the opposite sides of said abutment for effecting equalization of the fluid pressures on opposite sides of said abutment and thereby cause said abutment to operate the valve means to terminate further local venting of fluid under pressure from the brake pipe, means operative in response to the pressure of fluid locally vented from the brake pipe by said valve means for effecting operation of said valve, and means effective to cause the last said means to be effective to cause operation of said valve for a limited time only.

30. In a car brake equipment of the type having a brake pipe normally charged with fluid under pressure and a brake controlling valve device operatively responsive to variations of pressure in the brake pipe for controlling the brakes on the car, the combination of a movable abutment operatively responsive to a reduction of pressure in the brake pipe, means providing a chamber, valve means operated by the said abutment upon a reduction of pressure in the brake pipe for locally venting fluid under pressure from the brake pipe to said chamber, means responsive to a pressure in excess of a certain uniform pressure in said chamber for causing said movable abutment to operate the valve means to cut off the venting of fluid under pressure from the brake pipe to said chamber notwithstanding a continuing reduction of pressure in the brake pipe, and means for reducing the pressure in said chamber at a rate such that in a certain limited time the last said means is again conditioned so as to enable operation of the said abutment in response to the continuing reduction of pressure in the brake pipe.

JOSEPH C. McCUNE.